(12) United States Patent
Teranishi et al.

(10) Patent No.: US 11,292,874 B2
(45) Date of Patent: Apr. 5, 2022

(54) THERMOSETTING RESIN COMPOSITION, PREPREG, FIBER-REINFORCED PLASTIC MOLDED BODY AND METHOD FOR PRODUCING SAME

(71) Applicant: Mitsubishi Chemical Corporation, Chiyoda-ku (JP)

(72) Inventors: Takuya Teranishi, Tokyo (JP); Masahiro Ichino, Tokyo (JP); Kazuhisa Ikeda, Tokyo (JP); Akira Oota, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 271 days.

(21) Appl. No.: 16/281,298

(22) Filed: Feb. 21, 2019

(65) Prior Publication Data

US 2019/0185612 A1     Jun. 20, 2019

Related U.S. Application Data

(63) Continuation of application No. PCT/JP2017/030950, filed on Aug. 29, 2017.

(30) Foreign Application Priority Data

Aug. 29, 2016 (JP) ............................. JP2016-166878

(51) Int. Cl.
*C08G 59/50* (2006.01)
*B32B 5/26* (2006.01)
(Continued)

(52) U.S. Cl.
CPC .......... *C08G 59/5073* (2013.01); *B29C 43/20* (2013.01); *B29C 70/345* (2013.01);
(Continued)

(58) Field of Classification Search
CPC .............. C08G 59/5073; C08G 59/226; C08G 59/245; C08G 59/28; C08G 59/302;
(Continued)

(56) References Cited

U.S. PATENT DOCUMENTS

2006/0035088 A1  2/2006  Takano et al.
2008/0185753 A1  8/2008  Takano et al.
(Continued)

FOREIGN PATENT DOCUMENTS

| CN | 103958560 A | 7/2014 |
|----|-------------|--------|
| CN | 105949716 A | 9/2016 |

(Continued)

OTHER PUBLICATIONS

Combined Chinese Office Action and Search Report dated Aug. 27, 2020 in Chinese Patent Application No. 201780050676.3 (with unedited computer generated English translation), 19 pages.
(Continued)

*Primary Examiner* — David T Karst
(74) *Attorney, Agent, or Firm* — Oblon, McClelland, Maier & Neustadt, L.L.P.

(57) ABSTRACT

Provided is a thermosetting resin composition (C) of which curing can be started at a relatively low temperature in a short time and a cured product exhibits high heat resistance, the thermosetting resin composition (C) comprising an epoxy resin; an epoxy resin curing agent; and an epoxy resin curing accelerator, wherein the epoxy resin curing agent contains an imidazole-based curing agent 1 which is not encapsulated in a microcapsule and a curing agent 2 which is encapsulated in a microcapsule, and the epoxy resin curing accelerator comprises a urea derivative.

18 Claims, 3 Drawing Sheets

(51) Int. Cl.
*C08J 5/24* (2006.01)
*C08G 59/30* (2006.01)
*C08L 63/00* (2006.01)
*C08K 7/04* (2006.01)
*B32B 27/38* (2006.01)
*B29C 43/20* (2006.01)
*C08G 59/56* (2006.01)
*C08G 59/18* (2006.01)
*C08G 59/40* (2006.01)
*C08K 7/02* (2006.01)
*C08G 59/62* (2006.01)
*C08L 63/04* (2006.01)
*B29C 70/34* (2006.01)
*C08G 59/22* (2006.01)
*C08G 59/24* (2006.01)
*C08G 59/28* (2006.01)
*C08G 59/54* (2006.01)
*C08G 59/60* (2006.01)
*B29K 63/00* (2006.01)
*B29K 105/08* (2006.01)
*B29K 307/04* (2006.01)
*B29K 309/08* (2006.01)

(52) U.S. Cl.
CPC ............... *B32B 5/26* (2013.01); *B32B 27/38* (2013.01); *C08G 59/188* (2013.01); *C08G 59/226* (2013.01); *C08G 59/245* (2013.01); *C08G 59/28* (2013.01); *C08G 59/302* (2013.01); *C08G 59/4021* (2013.01); *C08G 59/54* (2013.01); *C08G 59/56* (2013.01); *C08G 59/60* (2013.01); *C08G 59/62* (2013.01); *C08J 5/24* (2013.01); *C08K 7/02* (2013.01); *C08K 7/04* (2013.01); *C08L 63/00* (2013.01); *C08L 63/04* (2013.01); *B29K 2063/00* (2013.01); *B29K 2105/089* (2013.01); *B29K 2307/04* (2013.01); *B29K 2309/08* (2013.01); *B32B 2260/046* (2013.01); *B32B 2262/101* (2013.01); *B32B 2262/106* (2013.01); *C08J 2363/00* (2013.01); *C08J 2363/04* (2013.01)

(58) Field of Classification Search
CPC .... C08G 59/4021; C08G 59/54; C08G 59/56; C08G 59/60; C08G 59/62; C08G 59/188; B29C 43/20; B29C 70/345; B32B 5/26; B32B 27/38; B32B 2260/046; B32B 2262/101; B32B 2262/106; C08J 5/24; C08J 2363/00; C08J 2363/04; C08K 7/02; C08K 7/04; C08L 63/00; C08L 63/04; B29K 2063/00; B29K 2105/089; B29K 2307/04; B29K 2309/08
USPC ......................................................... 428/413
See application file for complete search history.

(56) References Cited

U.S. PATENT DOCUMENTS

| | | |
|---|---|---|
| 2008/0185757 A1 | 8/2008 | Takano et al. |
| 2008/0187718 A1 | 8/2008 | Takano et al. |
| 2009/0202832 A1 | 8/2009 | Takano et al. |
| 2014/0235757 A1 | 8/2014 | Fukuhara et al. |
| 2014/0273693 A1* | 9/2014 | Fukuhara ............. C08G 59/302 442/175 |
| 2016/0280871 A1 | 9/2016 | Kaneko |
| 2017/0282516 A1 | 10/2017 | Teranishi et al. |
| 2018/0155489 A1 | 6/2018 | Ushiyama et al. |

FOREIGN PATENT DOCUMENTS

| | | |
|---|---|---|
| EP | 1 566 394 A1 | 8/2005 |
| EP | 3 075 785 A1 | 10/2016 |
| JP | 10-95048 | 4/1998 |
| JP | 10-128778 | 5/1998 |
| JP | 2002-159613 | 6/2002 |
| JP | 2016-522278 | 7/2016 |
| JP | 2016-210114 | 12/2016 |
| WO | WO 2004/048435 A1 | 6/2004 |
| WO | WO 2013/081058 A1 | 6/2013 |
| WO | WO 2013/081060 A1 | 6/2013 |
| WO | WO 2014/172444 A1 | 10/2014 |
| WO | WO 2016/060166 A1 | 4/2016 |
| WO | WO 2016/199857 A1 | 12/2016 |

OTHER PUBLICATIONS

Extended European Search Report dated Jun. 26, 2019 in European Patent Application No. 17846495.4, 9 pages.
Chinese Office Action dated May 18, 2021 in Chinese Patent Application No. 201780050676.3 (with English machine translation), 16 pages.
International Search Report dated Dec. 5, 2017 in PCT/JP2017/030950, filed Aug. 29, 2017 (with English Translation).
Office Action dated Nov. 20, 2018 in Japanese Application No. 2017-548498 (with English Translation).
Decision of Rejection dated Nov. 15, 2021, in Chinese Patent Application No. 201780050676.3 filed Aug. 29, 2017 (with English translation).

* cited by examiner

THERMOSETTING RESIN COMPOSITION, PREPREG, FIBER-REINFORCED PLASTIC MOLDED BODY AND METHOD FOR PRODUCING SAME

This application is a continuation application of International Application No. PCT/JP2017/030950, filed on Aug. 29, 2017, which claims the benefit of priority of the prior Japanese Patent Application No. 2016-166878 filed in Japan on Aug. 29, 2016, the entire contents of which are incorporated herein by reference.

TECHNICAL FIELD

The present invention relates to a thermosetting resin composition, a prepreg, a fiber-reinforced plastic molded body and a method for producing the same.

BACKGROUND ART

Fiber-reinforced plastic molded bodies containing a reinforcing fiber substrate and a matrix resin composition are widely used in industrial applications and the like such as aircraft and motor vehicles because of excellent mechanical properties and the like, and the application range thereof has been extended more and more in recent years. For example, a fiber-reinforced plastic molded body, formed by heating and pressurizing a prepreg laminate obtained by laminating a plurality of sheet-like prepreg substrates in which a reinforcing fiber substrate is impregnated with a matrix resin composition, is known.

As the reinforcing fiber substrate, a glass fiber or a carbon fiber is often used.

As a matrix resin composition, a thermosetting resin composition containing a phenol resin, a melamine resin, a bismaleimide resin, an unsaturated polyester resin, an epoxy resin or the like is often used from the viewpoint of excellent impregnating property and heat resistance. Among these, an epoxy resin composition is widely used since a fiber-reinforced plastic molded body which exhibits excellent heat resistance and moldability and has a higher mechanical strength is obtained.

In addition, as a fiber-reinforced plastic molded body, a fiber-reinforced plastic molded body which is molded by being heated and pressurized in a state in which a resin film containing a reinforcing fiber and a thermosetting resin composition is further laminated on the surface of a prepreg laminate for the purpose of suppressing a phenomenon that the fibers present in the vicinity of the surface are seen through (that is, preventing a phenomenon that the fibers are not sufficiently buried in the resin layer but are exposed) is known. Such a resin film has a higher proportion of thermosetting resin composition and a lower proportion of reinforcing fiber than the prepreg substrate.

As a method for producing a fiber-reinforced plastic molded body, for example, a method using an autoclave (Patent Document 1), a method using a vacuum bag (Patent Document 2), a compression molding method (Patent Document 3), and the like are known. However, in these methods, it is required to heat the prepreg laminate at 160° C. or higher for about from 2 to 6 hours until the prepreg laminate is cured when curing the prepreg laminate through heating and pressurization and thus the energy consumption is great and the productivity is low.

As a molding method to be frequently used in motor vehicle applications, high cycle press molding is known (Patent Document 4). In the high cycle press molding, curing is conducted at about 100° C. to 150° C. under a high pressure in a short time of about from several minutes to several tens of minutes in order to achieve mass production of products.

However, in a case in which molding is conducted by laminating a resin film on the surface of a prepreg laminate, the thermosetting resin composition in the vicinity of the surface excessively flows out from the edge portion of the mold in some cases as the viscosity of the thermosetting resin composition contained in the resin film decreases by an increase in the temperature under a high pressure. As described above, when the thermosetting resin composition on the surface excessively flows out of the mold, molding appearance defects are generated that the fibers are exposed by resin withering or fiber meandering due to excessive flow of resin on the surface of a molded body to be obtained. In this case, and a case in which the heat resistance of the thermosetting resin composition contained in the resin film on the surface is not sufficiently high, the molded body absorbs moisture with the elapse of time even being painted and streaky painting appearance defects are generated on the surface of the molded body by the relaxation of residual stress of the molded body when heat is applied.

CITATION LIST

Patent Document

Patent Document 1: JP 10-128778 A
Patent Document 2: JP 2002-159613 A
Patent Document 3: JP 10-95048 A
Patent Document 4: WO 2004/048435 A

DISCLOSURE OF THE INVENTION

Problem to be Solved by the Invention

An object of the present invention is to provide a thermosetting resin composition of which curing can be started at a relatively low temperature in a short time and a cured product exhibits high heat resistance and a prepreg to be obtained by impregnating a reinforcing fiber substrate with this thermosetting resin composition.

Another object of the present invention is to provide a fiber-reinforced plastic molded body which can suppress excessive flow of the resin at the time of heat and pressure treatment, in which the generation of appearance defects at molding such as resin withering and fiber meandering on the surface and a defect that fibers are seen through the surface are suppressed, and which exhibits excellent molding appearance and painting appearance, for example, even in the case of being subjected to high cycle press molding or being exposed to a wet heat condition by using a resin film to be obtained using the thermosetting resin composition of the present invention, and a method for producing the same.

Means for Solving Problem

[1] A thermosetting resin composition (C) containing an epoxy resin, an epoxy resin curing agent, and an epoxy resin curing accelerator, in which the epoxy resin curing agent contains an imidazole-based curing agent 1 which is not encapsulated in a microcapsule and a curing agent 2 which is encapsulated in a microcapsule, and the epoxy resin curing accelerator contains a urea derivative.

[2] The thermosetting resin composition (C) according to [1], in which the imidazole-based curing agent 1 is an imidazole-based curing agent 1 represented by the following Formula (1):

[Chem. 1]

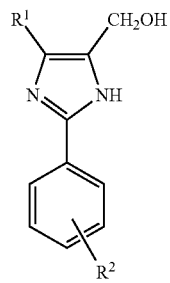
(1)

(where $R^1$ represents a linear or branched alkyl group having from 1 to 5 carbon atoms which may have a substituent, a phenyl group which may have a substituent, a hydrogen atom, or a hydroxymethyl group and $R^2$ represents a linear or branched alkyl group having from 1 to 5 carbon atoms, a phenyl group which may have a substituent, or a hydrogen atom).

[3] The thermosetting resin composition (C) according to [1] or [2], in which the urea derivative is 3-phenyl-1,1-dimethylurea or 2,4-bis(3,3-dimethylureido)toluene.

[4] The thermosetting resin composition (C) according to any one of [1] to [3], in which the imidazole-based curing agent 1 is 2-phenyl-4,5-dihydroxymethylimidazole or 2-phenyl-4-methyl-5-hydroxymethylimidazole.

[5] The thermosetting resin composition (C) according to any one of [1] to [4], in which the curing agent 2 which is encapsulated in a microcapsule contains an imidazole derivative represented by the following Formula (2):

[Chem. 2]

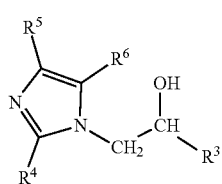
(2)

(where $R^3$ represents an organic group containing one or more carbon atoms and $R^4$ to $R^6$ are the same as or different from one another and each represent a hydrogen atom, a methyl group, or an ethyl group).

[6] The thermosetting resin composition (C) according to any one of [1] to [5], in which the epoxy resin contains an epoxy resin having a structure represented by the following Formula (3) in a molecule and/or a bisphenol A type epoxy resin:

[Chem. 3]

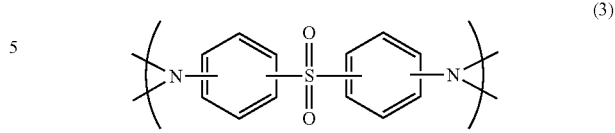
(3)

[7] The thermosetting resin composition (C) according to any one of [1] to [6], in which a content of the imidazole-based curing agent 1 in the thermosetting resin composition (C) is from 5% to 15% by mass, a content of the curing agent 2 which is encapsulated in a microcapsule is from 1% to 3% by mass, and a content of the urea derivative is from 2% to 5% by mass.

[8] A thermosetting resin composition (C), in which the thermosetting resin composition (C) has a lowest viscosity at from 80° C. to 98° C. in temperature-programmed viscosity measurement to be conducted under conditions of an initial temperature of 30° C. and a rate of temperature increase of 2.0° C./min and a glass transition temperature of a cured product to be obtained by heating the thermosetting resin composition (C) at 140° C. for 5 minutes to be attained by dynamic viscoelasticity measurement is 150° C. or higher.

[9] A prepreg containing a reinforcing fiber substrate impregnated with the thermosetting resin composition (C) according to any one of [1] to [8].

[10] The prepreg according to [9], in which the reinforcing fiber substrate is a glass fiber.

[11] The prepreg according to [9], in which the reinforcing fiber substrate is a carbon fiber.

[12] A method for producing a fiber-reinforced plastic molded body, including:
producing a film laminate (F) by laminating a resin film formed using a thermosetting resin composition (C) on at least one surface of a prepreg laminate (E) obtained by laminating a plurality of sheet-like prepreg substrates formed by impregnating a reinforcing fiber substrate (A) with a thermosetting resin composition (B); and
subjecting the obtained laminate to a heat and pressure treatment using a mold, in which
the thermosetting resin composition (C) is the thermosetting resin composition (C) described in [1] to [8].

[13] The method for producing a fiber-reinforced plastic molded body according to [12], in which the resin film contains a reinforcing fiber substrate (D) having a fiber areal weight of 50 g/m² or less.

[14] The method for producing a fiber-reinforced plastic molded body according to [12] or [13], in which the reinforcing fiber substrate (D) is a nonwoven fabric formed of a reinforcing fiber.

[15] The method for producing a fiber-reinforced plastic molded body according to any one of [12] to [14], in which a preform is produced by shaping the film laminate (F) obtained in the production of the film laminate (F) and the preform used as the laminate is subjected to a heat and pressure treatment using a mold.

[16] A fiber-reinforced plastic molded body which is a cured product of the film laminate (F) according to [13] or [14] or the preform according to [15].

[17] A fiber-reinforced plastic molded body which is a cured product of the prepreg according to any one of [9] to [11].

Effect of the Invention

According to the present invention, a thermosetting resin composition of which curing can be started at a relatively low temperature in a short time and a cured product exhibits high heat resistance and a prepreg to be obtained by impregnating a reinforcing fiber substrate with this thermosetting resin composition are provided.

According to the present invention, a fiber-reinforced plastic molded body which can suppress excessive flow of the resin at the time of heat and pressure treatment, in which the generation of molding appearance defects such as resin withering and fiber meandering on the surface and a defect that fibers are seen through the surface are suppressed, and which exhibits excellent molding appearance and painting appearance, for example, even in the case of being subjected to high cycle press molding or being exposed to a wet heat condition by using a resin film to be obtained using the thermosetting resin composition of the present invention, and a method for producing the same are also provided.

MODE(S) FOR CARRYING OUT THE INVENTION

Figure 1:
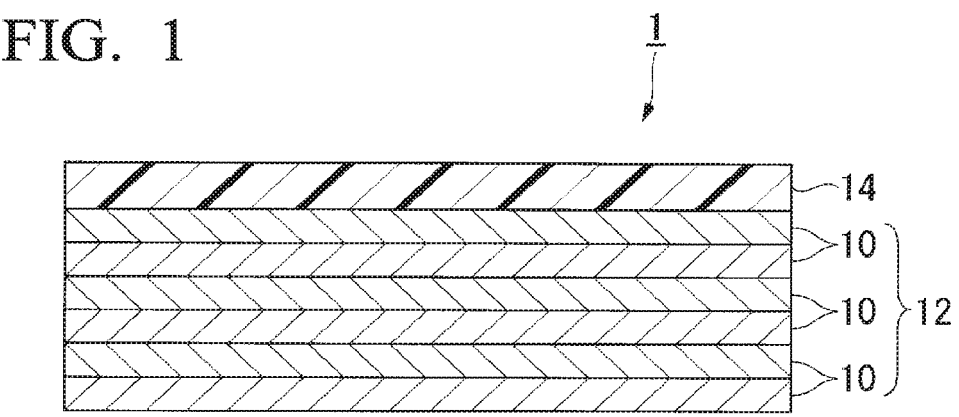
FIG. 1 is a cross-sectional view illustrating an example of a laminate to be used in a method for producing a fiber-reinforced plastic molded body of the present invention.

Hereinafter, preferred embodiments of the present invention will be described, but the present invention is not limited only to these embodiments.

<Thermosetting Resin Composition (C)>

The thermosetting resin composition (C) of the present invention contains an epoxy resin, an epoxy resin curing agent, and an epoxy resin curing accelerator, and in the thermosetting resin composition (C), the epoxy resin curing agent contains an imidazole-based curing agent 1 which is not encapsulated in a microcapsule and a curing agent 2 which is encapsulated in a microcapsule and the epoxy resin curing accelerator contains a urea derivative.

By using the imidazole-based curing agent 1 which is not encapsulated in a microcapsule, it is possible to increase the temperature for reaction initiation. It is thus possible to increase the glass transition temperature of cured product to be attained by dynamic viscoelasticity measurement.

By using the curing agent 2 which is encapsulated in a microcapsule, it is possible to achieve both stability and fast curability of the thermosetting resin composition.

In addition, it is possible to quickly cure the thermosetting resin composition since the urea derivative has an effect of accelerating curing at a relatively low temperature.

In the thermosetting resin composition (C) of the present invention, the temperature at which the lowest viscosity is attained is preferably from 80° C. to 98° C., more preferably from 85° C. to 97° C., and still more preferably from 90° C. to 95° C. in the temperature-programmed viscosity measurement in which the initial temperature is set to 30° C. and the temperature is increased at 2.0° C./min.

By concurrently using the curing agent 2 which is encapsulated in a microcapsule and the urea derivative, it is possible to achieve the above property.

When the temperature at which the lowest viscosity is attained in the temperature-programmed viscosity measurement described above is in the above range, the amount of the thermosetting resin composition (C) flowing at the time of molding is likely to be suppressed in a proper range. When the temperature at which the lowest viscosity is attained in the temperature-programmed viscosity measurement described above is equal to or higher than the lower limit value, the amount of the thermosetting resin composition (C) flowing at the time of molding is not too small and the thermosetting resin composition (C) is likely to spread to every corner of the molding mold. When the temperature at which the lowest viscosity is attained in the temperature-programmed viscosity measurement described above is equal to or lower than the upper limit value, excessive flow of the thermosetting resin composition (C) at the time of molding is likely to be suppressed and molding appearance defects such as concave and convex on the surface of the molded body is less likely to occur, the fiber is less likely to be exposed by resin withering, or the fiber meandering due to excessive flow of resin is less likely to occur.

It is preferable that the glass transition temperature of a cured product to be obtained by heating the thermosetting resin composition (C) of the present invention at 140° C. for 5 minutes to be attained by dynamic viscoelasticity measurement is 150° C. or higher.

By concurrently using the imidazole-based curing agent 1 which is not encapsulated in a microcapsule and the curing agent 2 which is encapsulated in a microcapsule, it is possible to achieve the above property.

When the glass transition temperature in the dynamic viscoelasticity measurement described above is equal to or higher than the lower limit value, appearance defects are less likely to be generated even when moisture absorption and heating and cooling are repeated under the conditions of use after the cured product has been painted. The glass transition temperature is more preferably 152° C. or higher.

When curing the thermosetting resin composition (C) in the dynamic viscoelasticity measurement described above, there is a method in which the thermosetting resin composition (C) is sandwiched between glass plates and heated in an oven or a method in which the resin is placed in a preheated mold and the mold is closed and heated. As the curing time, curing is conducted for 5 minutes after the temperature of the glass plate or mold which is in contact with the resin has reached 140° C.

In other words, in the case of a method in which the thermosetting resin composition (C) is sandwiched between glass plates and heated in an oven, the thermosetting resin composition (C) is sandwiched between glass plates, placed in an oven at 140° C., heating is stopped when 5 minutes elapses after the temperature of the glass plate has reached 140° C., and the cured product is take out from the oven. In addition, in a method in which the resin is placed in a preheated mold and the mold is closed and heated, the resin is poured into a mold heated to 140° C., the mold is immediately closed and held at 140° C., the mold is opened after 5 minutes, and the cured product is taken out from the mold.

The glass transition point of the cured product is determined by a method to be described later because of the temperature dependency of the shear storage modulus (G') of the cured product to be attained by dynamic viscoelasticity measurement.

It is preferable that the thermosetting resin composition (C) of the present invention has the lowest viscosity at from 80° C. to 98° C. in the temperature-programmed viscosity measurement to be conducted under conditions of an initial temperature of 30° C. and a rate of temperature increase of 2.0° C./min and the glass transition temperature of a cured product to be obtained by heating the thermosetting resin composition (C) at 140° C. for 5 minutes to be attained by the dynamic viscoelasticity measurement is 150° C. or higher.

When the temperature at which the lowest viscosity is attained in the temperature-programmed viscosity measurement and the glass transition temperature of the cured product to be attained by the dynamic viscoelasticity measurement are in the above ranges, it is possible to suppress the molding defects and appearance defects described above.

These properties can be achieved by using the imidazole-based curing agent 1 which is not encapsulated in a microcapsule, the curing agent 2 which is encapsulated in a microcapsule, and the urea derivative concurrently.

The viscosity of the thermosetting resin composition (C) of the present invention at 30° C. is preferably from $1.0 \times 10^2$ to $1.0 \times 10^5$ Pa·s, more preferably $5.0 \times 10^2$ to $9.8 \times 10^4$ Pa·s, and still more preferably $1.0 \times 10^3$ to $9.7 \times 10^4$ Pa·s.

The viscosity of the thermosetting resin composition (C) at 30° C. can be mainly achieved by adjusting the ratio of an epoxy resin which is liquid at room temperature to an epoxy resin which is solid at room temperature.

When the viscosity of the thermosetting resin composition (C) at 30° C. is in the above range, the shape of the prepreg of the present invention is easily maintained.

In addition, when the viscosity of the thermosetting resin composition (C) at 30° C. is equal to or higher than the lower limit value, a resin film formed using the thermosetting resin composition (C) exhibits excellent handling properties and work such as fabrication and lamination of the resin film and molding is facilitated. When the viscosity of the thermosetting resin composition (C) at 30° C. is equal to or lower than the upper limit value, a reinforcing fiber substrate (D) to be described later or a reinforcing fiber substrate is easily impregnated with the thermosetting resin composition (C) at the time of fabrication of a resin film containing the reinforcing fiber substrate (D) and at the time of fabrication of the prepreg of the present invention, excessive heating is not required at the time of impregnation, and the draping property of the resin film is also hardly impaired.

The lowest viscosity in the temperature-programmed viscosity measurement is preferably from 0.5 Pa·s to 50 Pa·s, more preferably from 1 Pa·s to 10 Pa·s, and still more preferably from 2 Pa·s to 5 Pa·s.

When the lowest viscosity in the temperature-programmed viscosity measurement is in the above range, molding appearance defects are hardly generated. When the lowest viscosity in the temperature-programmed viscosity measurement is equal to or higher than the lower limit value, excessive flow of the thermosetting resin composition (C) is likely to be suppressed and appearance defects such as concave and convex are hardly generated on the surface of the molded body. When the lowest viscosity in the temperature-programmed viscosity measurement is equal to or lower than the upper limit value, the thermosetting resin composition (C) is likely to spread to every corner of the mold at the time of molding and molded body having favorable appearance is likely to be obtained.

(Epoxy Resin)

Examples of the epoxy resin to be contained in the thermosetting resin composition (C) of the present invention may include a compound having two or more epoxy groups in the molecule.

As the examples of the epoxy resin, a glycidyl ether type epoxy resin to be obtained from a compound having a hydroxyl group in the molecule and epichlorohydrin, a glycidyl amine type epoxy resin to be obtained from a compound having an amino group in the molecule and epichlorohydrin, a glycidyl ester type epoxy resin to be obtained from a compound having a carboxyl group in the molecule and epichlorohydrin, an alicyclic epoxy resin to be obtained by oxidizing a compound having a double bond in the molecule, an epoxy resin having a heterocyclic structure, or an epoxy resin in which two or more kinds of groups to be selected from these are mixed in the molecule is used.

In addition, as an epoxy resin other than these, an epoxy resin having a structure represented by Formula (3) above in the molecule can also be used.

[Glycidyl Ether Type Epoxy Resin]

Specific examples of the glycidyl ether type epoxy resin may include aryl glycidyl ether type epoxy resins such as a bisphenol A type epoxy resin, a bisphenol F type epoxy resin, a bisphenol S type epoxy resin, a resorcinol type epoxy resin, a phenol novolak type epoxy resin, a trisphenol novolak type epoxy resin, a naphthalene type epoxy resin, and an anthracene type epoxy resin; a polyethylene glycol type epoxy resin, a polypropylene glycol type epoxy resin, a dicyclopentadiene type epoxy resin, and positional isomers thereof and substitution products thereof with an alkyl group and halogen.

Examples of commercially available products of a bisphenol A type epoxy resin may include EPON 825, jER 826, jER 827, and jER 828 (all manufactured by Mitsubishi Chemical Corporation), EPICLON (registered trademark) 850 (manufactured by DIC Corporation), Epototo (registered trademark) YD-128 (manufactured by NIPPON STEEL & SUMIKIN CHEMICAL CO., LTD.), DER-331 and DER-332 (all manufactured by The Dow Chemical Company), and Bakelite EPR 154, Bakelite EPR 162, Bakelite EPR 172, Bakelite EPR 173, and Bakelite EPR 174 (all manufactured by Bakelite GmbH).

Examples of commercially available products of a bisphenol F type epoxy resin may include jER 806, jER 807, and jER 1750 (all manufactured by Mitsubishi Chemical Corporation), EPICLON (registered trademark) 830 (manufactured by DIC Corporation), and Epototo (registered trademark) YD-170 and Epototo (registered trademark) YD-175 (all manufactured by NIPPON STEEL & SUMIKIN CHEMICAL CO., LTD.), Bakelite EPR 169 (manufactured by Bakelite GmbH), and GY 281, GY 282, and GY 285 (all manufactured by Huntsman Advanced Materials LLC).

Examples of commercially available products of a bisphenol S type epoxy resin may include EPICLON (registered trademark) EXA-1514 (manufactured by DIC Corporation).

Examples of commercially available products of a resorcinol type epoxy resin may include DENACOL (registered trademark) EX-201 (manufactured by Nagase ChemteX Corporation).

Examples of commercially available products of a phenol novolak type epoxy resin may include jER 152 and jER 154 (all manufactured by Mitsubishi Chemical Corporation), EPICLON (registered trademark) 740 (manufactured by DIC Corporation), and EPN 179 and EPN 180 (manufactured by Huntsman Advanced Materials LLC).

Examples of commercially available products of a trisphenolmethane type epoxy resin may include TACTIX (registered trademark) 742 (manufactured by Huntsman Advanced Materials LLC), EPPN 501H, EPPN 501HY, EPPN 502H, and EPPN 503H (all manufactured by Nippon Kayaku Co., Ltd.), and jER 1032H60 (manufactured by Mitsubishi Chemical Corporation).

Examples of commercially available products of a naphthalene type epoxy resin may include HP-4032 and HP-4700 (manufactured by DIC Corporation) and NC-7300 (manufactured by Nippon Kayaku Co., Ltd.).

Examples of commercially available products of a dicyclopentadiene type epoxy resin may include XD-100 (manufactured by Nippon Kayaku Co., Ltd.) and HP 7200 (manufactured by DIC Corporation).

Examples of commercially available products of an anthracene type epoxy resin may include YL7172YX-8800 (manufactured by Mitsubishi Chemical Corporation).

As the glycidyl ether type epoxy resin, a bisphenol A type epoxy resin is preferable.

[Glycidyl Amine Type Epoxy Resin]

Specific examples of the glycidyl amine type epoxy resin may include tetraglycidyl diaminodiphenylmethanes, a glycidyl compound of aminophenol, a glycidyl compound of aminocresol, glycidylanilines, and a glycidyl compound of xylenediamine.

Examples of commercially available products of tetraglycidyl diaminodiphenylmethanes may include SUMI-EPOXY (registered trademark) ELM-434 (manufactured by Sumitomo Chemical Company, Limited), ARALDITE (registered trademark) MY 720, ARALDITE (registered trademark) MY 721, ARALDITE (registered trademark) MY 9512, ARALDITE (registered trademark) MY 9612, ARALDITE (registered trademark) MY 9634, and ARALDITE (registered trademark) MY 9663 (all manufactured by Huntsman Advanced Materials LLC), jER 604 (manufactured by Mitsubishi Chemical Corporation), and Bakelite EPR 494, Bakelite EPR 495, Bakelite EPR 496, and Bakelite EPR 497 (all manufactured by Bakelite GmbH).

Examples of commercially available products of a glycidyl compound of aminophenol and a glycidyl compound of aminocresol may include jER 630 (manufactured by Mitsubishi Chemical Corporation), ARALDITE (registered trademark) MY 0500, ARALDITE (registered trademark) MY 0510, and ARALDITE (registered trademark) MY 0600 (all manufactured by Huntsman Advanced Materials LLC), and SUMI-EPOXY (registered trademark) ELM 120 and SUMI-EPOXY (registered trademark) ELM 100 (all manufactured by Sumitomo Chemical Company, Limited).

Examples of commercially available products of glycidylanilines may include GAN and GOT (Nippon Kayaku Co., Ltd.) and Bakelite EPR 493 (manufactured by Bakelite GmbH).

Examples of a glycidyl compound of xylenediamine may include TETRAD (registered trademark)-X (manufactured by MITSUBISHI GAS CHEMICAL COMPANY, INC.).

[Glycidyl Ester Type Epoxy Resin]

Specific examples of the glycidyl ester type epoxy resin may include phthalic acid diglycidyl ester, hexahydrophthalic acid diglycidyl ester, isophthalic acid diglycidyl ester, dimer acid diglycidyl ester, and isomers thereof.

Examples of commercially available products of phthalic acid diglycidyl ester may include Epomic (registered trademark) R508 (manufactured by Mitsui Chemicals, Inc.) and DENACOL (registered trademark) EX-721 (manufactured by Nagase ChemteX Corporation).

Examples of commercially available products of hexahydrophthalic acid diglycidyl ester may include Epomic (registered trademark) R540 (manufactured by Mitsui Chemicals, Inc.) and AK-601 (manufactured by Nippon Kayaku Co., Ltd.).

Examples of commercially available products of dimer acid diglycidyl ester may include jER 871 (manufactured by Mitsubishi Chemical Corporation) and Epototo (registered trademark) YD-171 (manufactured by NIPPON STEEL & SUMIKIN CHEMICAL CO., LTD.).

[Alicyclic Epoxy Resin]

Specific examples of the alicyclic epoxy resin may include a compound having a 1,2-epoxycyclohexane ring as a partial structure.

Examples of commercially available products of a compound having a 1,2-epoxycyclohexane ring as a partial structure may include CELLOXIDE (registered trademark) 2021P, CELOXIDE (registered trademark) 2081, and CELOXIDE (registered trademark) 3000 (all manufactured by Daicel Corporation) and CY 179 (manufactured by Huntsman Advanced Materials LLC).

[Epoxy Resin Having Heterocyclic Structure]

Specific examples of the epoxy resin having a heterocyclic structure may include a compound having an oxazolidone ring as a partial structure and a compound having a xanthene skeleton as a partial structure.

Examples of commercially available products of a compound having an oxazolidone ring as a partial structure may include AER 4152, AER 4151, LSA 4311, LSA 4313, and LSA 7001 (all manufactured by Asahi Kasei E-materials Corporation).

Examples of commercially available products of a compound having a xanthene skeleton as a partial structure may include EXA-7335 (manufactured by DIC Corporation).

[Epoxy Resin Having Structure Represented by Formula (3) in Molecule]

Examples of the epoxy resin having a structure represented by the following Formula (3) in the molecule may include a reaction product of an epoxy resin with an amine compound having at least one sulfur atom in the molecule.

[Chem. 4]

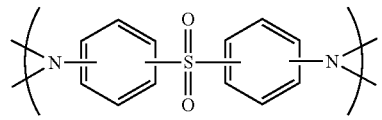

(3)

Examples of the amine compound having at least one sulfur atom in the molecule may include 4,4'-diaminodiphenylsulfone, 3,3'-diaminodiphenylsulfone, bis(4-(4-aminophenoxy)phenyl)sulfone, bis(4-(3-aminophenoxy)phenyl)sulfone, and any derivative thereof.

Among these, it is preferable to use diaminodiphenylsulfone and it is more preferable to use 4,4'-diaminodiphenylsulfone from the viewpoint of heat resistance of the cured resin.

In addition, examples of the epoxy resin which reacts with an amine compound having at least one sulfur atom in the molecule to form an epoxy resin having a structure represented by Formula (3) above in the molecule may include bisphenol type epoxy resins such as a bisphenol A type epoxy resin and a bisphenol F type epoxy resin, but a bisphenol A type epoxy resin is preferable among these.

Examples of a method for obtaining the epoxy resin having a structure represented by Formula (3) may include a method in which an epoxy resin is mixed with an amine compound having at least one sulfur atom in the molecule, specifically, an amine compound having a structure represented by Formula (3) at a mass ratio of from 100:3 to 100:30, preferably from 100:5 to 100:20 and the mixture is heated at from 130° C. to 200° C., preferably from 140° C. to 170° C. for reaction. In the case of using this method, the unreacted epoxy resin and the amine compound remain in the reaction product in some cases, but it is not particularly required to remove these residues.

It is preferable to use an epoxy resin having a structure represented by Formula (3) above in the molecule as the epoxy resin to be contained in the thermosetting resin composition (C) of the present invention since it is possible to easily adjust the viscosity of the thermosetting resin composition (C).

In other words, it is possible to control the viscosity of the reaction product to be obtained high by adjusting the conditions of the reaction of the epoxy resin with the amine compound having at least one sulfur atom in the molecule, for example, by increasing the reaction temperature and the reaction time, and it is possible to control the viscosity of the reaction product to be obtained low by decreasing the reaction temperature and the reaction time. Accordingly, it is possible to adjust the viscosity of the thermosetting resin composition (C) by blending the epoxy resin containing the reaction product having a desired viscosity as the epoxy resin to be contained in the thermosetting resin composition (C) of the present invention.

These epoxy resins may be used singly or two or more kinds of thereof may be used concurrently.

In the case of concurrently using two or more kinds of these epoxy resins, it is preferable to use an epoxy resin which is liquid at room temperature and an epoxy resin which is solid at room temperature in combination in order to adjust the viscosity of the thermosetting resin composition (C) to a viscosity range in which the shape of the prepreg can be maintained.

The content of the epoxy resin which is liquid at room temperature in 100 parts by mass of the epoxy resin (A) is preferably from 10 to 90 parts by mass, more preferably from 15 to 90 parts by mass, and still more preferably from 20 to 90 parts by mass.

It is preferable to set the viscosity of the thermosetting resin composition (C) to a proper range by setting the content of the epoxy resin which is liquid at room temperature in 100 parts by mass of the epoxy resin (A) to the above range.

Examples of commercially available products of the epoxy resin which is liquid at room temperature may include bisphenol A type epoxy resins such as jER 825, 826, 827, 828, and 834 (all manufactured by Mitsubishi Chemical Corporation), EPICLON (registered trademark) 850 (manufactured by DIC Corporation), Epototo (registered trademark) YD-128 (manufactured by NIPPON STEEL & SUMIKIN CHEMICAL CO., LTD.), DER-331 and DER-332 (manufactured by The Dow Chemical Company), and ARALDITE (registered trademark) LY 556 (manufactured by Huntsman Advanced Materials LLC);

bisphenol F type epoxy resins such as jER 806, 807, and 1750 (all manufactured by Mitsubishi Chemical Corporation), EPICLON (registered trademark) 830 (manufactured by DIC Corporation), and Epototo (registered trademark) YD-170 and Epototo (registered trademark) YD-175 (all manufactured by NIPPON STEEL & SUMIKIN CHEMICAL CO., LTD.);

phenol novolak type epoxy resins such as jER 152 (manufactured by Mitsubishi Chemical Corporation), EPICLON (registered trademark) N-730A (manufactured by DIC Corporation), and DEN-425 (manufactured by The Dow Chemical Company);

amine type epoxy resins such as jER 604 and 630 (all manufactured by Mitsubishi Chemical Corporation) and MY 0600 and MY 0500 (all manufactured by Huntsman Advanced Materials LLC); and alicyclic epoxy resins such as CELLOXIDE 2021P and CELLOXIDE 8000 (manufactured by Daicel Corporation).

These epoxy resins which are liquid at room temperature may be used singly or two or more kinds thereof may be used concurrently.

As the epoxy resin which is liquid at room temperature, a bisphenol A type epoxy resin and a phenol novolak type epoxy resin are preferable from the viewpoint of an excellent balance between toughness and heat resistance of the cured product.

The content of epoxy resin which is solid at room temperature in 100 parts by mass of the epoxy resin (A) is more preferably from 10 to 90 parts by mass and still more preferably from 15 to 90 parts by mass.

It is preferable to set the viscosity of the thermosetting resin composition (C) to a proper range by setting the content of the epoxy resin which is solid at room temperature in 100 parts by mass of the epoxy resin (A) to the above range.

Examples of commercially available products of the epoxy resin which is solid at room temperature may include phenol novolak type epoxy resins such as jER 154 and 157570 (all manufactured by Mitsubishi Chemical Corporation), and EPICLON (registered trademark) N-770, EPICLON (registered trademark) N-740, and EPICLON (registered trademark) N-775 (all manufactured by DIC Corporation);

cresol novolak type epoxy resins such as EPICLON (registered trademark) N-660, EPICLON (registered trademark) N-665, EPICLON (registered trademark) N-670, EPICLON (registered trademark) N-673, and EPICLON (registered trademark) N-695 (all manufactured by DIC Corporation) and EOCN-1020, EOCN-102S, and EOCN-104S (all manufactured by Nippon Kayaku Co., Ltd.);

bisphenol A type epoxy resins such as jER 1001, 1002, and 1003 (all manufactured by Mitsubishi Chemical Corporation);

bisphenol F type epoxy resins such as jER 4004P and 4005P (manufactured by Mitsubishi Chemical Corporation);

trisphenolmethane type epoxy resins such as jER 1032H60 (manufactured by Mitsubishi Chemical Corporation);

biphenyl type epoxy resins such YX 4000 and YL6121H (manufactured by Mitsubishi Chemical Corporation);

naphthalene type epoxy resins such as HP4700 (manufactured by DIC Corporation);

dicyclopentadiene type epoxy resins such as HP7200 (manufactured by DIC Corporation);

epoxy resins having an oxazolidone ring skeleton such as TSR-400 (manufactured by DIC Corporation), DER 858 (manufactured by The Dow Chemical Company), and AER 4152 (manufactured by Asahi Kasei E-materials Corporation); and bisphenol S type epoxy resins such as EXA-1514 and EXA-1517 (manufactured by DIC Corporation).

In addition, as the epoxy resin which is solid at room temperature, an epoxy resin having a structure represented by Formula (3) above in the molecule may be used.

By using an epoxy resin having a structure represented by Formula (3) above in the molecule as the epoxy resin which is solid at room temperature, the curing time of the thermosetting resin composition (C) can be decreased and a cured product of the thermosetting resin composition (C) can exhibit high mechanical properties.

These epoxy resins which are solid at room temperature may be used singly or two or more kinds thereof may be used concurrently.

The molecular weight of the epoxy resin to be contained in the thermosetting resin composition (C) of the present invention is preferably from 200 to 3,000 and more preferably from 300 to 2,000.

When the molecular weight of the epoxy resin to be contained in the thermosetting resin composition (C) of the present invention is in the above range, it is easy to adjust the viscosity of the thermosetting resin composition (C) to a desired value to be described later.

Here, the molecular weight refers to a weight average molecular weight in terms of polystyrene as determined by gel permeation chromatography.

The epoxy equivalent of the epoxy resin contained in the thermosetting resin composition (C) of the present invention is preferably from 50 to 1000 g/eq and more preferably from 90 to 700 g/eq. It is preferable that the weight of the epoxy resin contained in the thermosetting resin composition (C) of the present invention per epoxy equivalent is in the above range since the crosslinked structure of a cured product of the thermosetting resin composition (C) is uniform.

Here, epoxy equivalent means the molecular weight of the epoxy resin per one epoxy group.

It is preferable that the epoxy resin to be contained in the thermosetting resin composition (C) of the present invention contains an epoxy resin having a structure represented by Formula (3) above in the molecule or a bisphenol A type epoxy resin.

In addition, it is preferable that the epoxy resin to be contained in the thermosetting resin composition (C) of the present invention contains an epoxy resin having a structure represented by Formula (3) above in the molecule and/or a bisphenol A type epoxy resin. In other words, it is preferable that the epoxy resin to be contained in the thermosetting resin composition (C) of the present invention contains an epoxy resin having a structure represented by Formula (3) above in the molecule, it is preferable the epoxy resin contains a bisphenol A type epoxy resin as another aspect, and it is preferable the epoxy resin contains an epoxy resin having a structure represented by Formula (3) above in the molecule and a bisphenol A type epoxy resin as still another aspect.

The content of the epoxy resin in 100 parts by mass of the thermosetting resin composition (C) of the present invention is usually from 60 to 95 parts by mass, preferably from 65 to 93 parts by mass, and more preferably from 70 to 90 parts by mass.

The mechanical properties of a cured product of the thermosetting resin composition (C) are likely to be maintained high by setting the content of the epoxy resin to equal to or higher than the lower limit value. The heat resistance at the time of curing hardly diminishes by setting the content of the epoxy resin to equal to or lower than the upper limit value.

(Epoxy Resin Curing Agent)

The epoxy resin curing agent to be contained in the thermosetting resin composition (C) of the present invention contains an imidazole-based curing agent 1 which is not encapsulated in a microcapsule and a curing agent 2 which is encapsulated in a microcapsule.

[Imidazole-Based Curing Agent 1]

The imidazole-based curing agent 1 to be contained in the thermosetting resin composition (C) of the present invention is an imidazole compound, and it is contained in the thermosetting resin composition (C) without being encapsulated in a microcapsule.

The imidazole-based curing agent 1 functions as an epoxy resin curing agent of the epoxy resin to be contained in the thermosetting resin composition (C) of the present invention. The imidazole-based curing agent 1 can cure the thermosetting resin composition (C) in a short time by being blended in the thermosetting resin composition (C) in combination with the curing agent 2 which is encapsulated in a microcapsule and the urea derivative comprised in the epoxy resin curing accelerator.

In addition, by containing the imidazole-based curing agent 1 in the thermosetting resin composition (C) of the present invention, it is possible to improve the heat resistance of the cured product.

The structure of the imidazole-based curing agent 1 is not particularly limited as long as it satisfies the above property, but the imidazole-based curing agent 1 is preferably an imidazole compound represented by the following Formula (1) since this exhibits high storage stability and the cured product exhibits high heat resistance.

[Chem. 5]

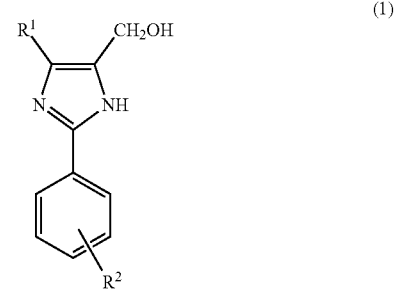

(Where $R^1$ represents a linear or branched alkyl group having from 1 to 5 carbon atoms which may have a substituent, a phenyl group which may have a substituent, a hydrogen atom, or a hydroxymethyl group and $R^2$ represents a linear or branched alkyl group having from 1 to 5 carbon atoms, a phenyl group which may have a substituent, or a hydrogen atom).

It is preferable that $R^1$ represents a linear or branched alkyl group having from 1 to 5 carbon atoms which may have a substituent, a phenyl group which may have a substituent, or a hydroxymethyl group since the imidazole compound exhibits low solubility in the epoxy resin and high storage stability. It is still more preferable that $R^1$ represents a methyl group or a hydroxymethyl group since the imidazole compound exhibits particularly low solubility in the epoxy resin and the production thereof is relatively easy.

It is preferable that $R^2$ represents a linear or branched alkyl group having from 1 to 5 carbon atoms which may have a substituent or a hydrogen atom since the imidazole compound reacts with the epoxy resin at a relatively high temperature and a cured product exhibiting high heat resistance is obtained. It is still more preferable that $R^2$ represents a methyl group or a hydrogen atom since the production of the imidazole compound is relatively easy.

Examples of the imidazole compound represented by Formula (1) above may include imidazole compounds in which the hydrogen at position 5 in 1H-imidazole is substituted with a hydroxymethyl group and the hydrogen at position 2 is substituted with a phenyl group or an alkylphenyl group such as 2-phenyl-4,5-dihydroxymethylimidazole, 2-phenyl-4-methyl-5-hydroxymethylimidazole, 2-phenyl-4-benzyl-5-hydroxymethylimidazole, 2-para-toluyl-4-methyl-5-hydroxymethylimidazole, 2-meta-toluyl-4-methyl-5-hydroxymethylimidazole, 2-meta-toluyl-4,5-dihydroxymethylimidazole, and 2-para-toluoyl-4,5-dihydroxymethylimidazole. Among these, 2-phenyl-4,5-dihydroxymethylimidazole, 2-phenyl-4-methyl-5-hydroxymethylimidazole, 2-para-toluoyl-4-methyl-5-hydroxymethyl imidazole, 2-meta-toluyl-4-methyl-5-hydroxymethylimidazole, 2-meta-toluoyl-4,5-dihydroxymethylimidazole and 2-para-toluoyl-4,5-dihydroxymethylimidazole are preferable.

The imidazole-based curing agent 1 may be used singly, or two or more kinds thereof may be used in combination.

The imidazole-based curing agent 1 is usually a crystalline solid under a condition of room temperature (25° C.) and exhibits low solubility in an epoxy resin at 100° C. or lower. Hence, the imidazole-based curing agent 1 is preferably a powder having a volume average particle diameter of 100 μm or less, particularly 20 μm or less.

When the volume average particle diameter of the imidazole-based curing agent 1 is equal to or smaller than the upper limit value, the imidazole-based curing agent 1 is favorably dispersed in the thermosetting resin composition (C) and can accelerate the curing reaction.

Incidentally, the volume average particle diameter can be measured by using a particle size meter (product name: AEOTRAC SPR Model: 7340 manufactured by NIKKISO CO., LTD.), and the value of $D_{50}$ in the particle size distribution measured is taken.

The imidazole-based curing agent 1 is particularly preferably 2-phenyl-4,5-dihydroxymethylimidazole and 2-phenyl-4-methyl-5-hydroxymethylimidazole from the viewpoint of exhibiting high storage stability and of being able to increase the heat resistance of a cured product of the thermosetting resin composition (C) of the present invention.

Examples of commercially available products of these may include CUREZOL (registered trademark) 2PHZ and 2P4MHZ and 2PHZ-PW and 2P4MHZ-PW of finely pulverized products thereof manufactured by SHIKOKU CHEMICALS CORPORATION, but the examples are not limited thereto.

The content of the imidazole-based curing agent 1 in 100% by mass of the thermosetting resin composition (C) of the present invention is preferably from 5% to 15% by mass, more preferably from 5% to 13% by mass, and still more preferably from 5% to 10% by mass.

By setting the content of the imidazole-based curing agent 1 to be equal to or higher than the lower limit value, the curability of the thermosetting resin composition (C) is improved and the cured product exhibits high heat resistance. It is preferable to set the content of the imidazole-based curing agent 1 to be equal to or lower than the upper limit value since it is easy to maintain the mechanical properties of a cured product of the thermosetting resin composition (C) high.

[Curing Agent 2 Encapsulated in Microcapsule]

The curing agent 2 which is encapsulated in a microcapsule and is to be contained in the thermosetting resin composition (C) of the present invention is not particularly limited as long as it is encapsulated in a microcapsule, but it is preferably an imidazole derivative having a substituted imidazole ring in the molecule from the viewpoint of being easily microencapsulated and of not impairing the heat resistance of a cured product of the thermosetting resin composition (C).

The imidazole derivative is not particularly limited as long as it is a compound which has a function of initiating curing of the thermosetting resin composition (C) at from 70° C. to 110° C., but it is preferably an imidazole derivative represented by the following Formula (2).

[Chem. 6]

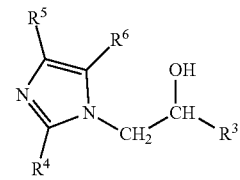

(2)

(Where $R^3$ represents an organic group containing one or more carbon atoms and $R^4$ to $R^6$ are the same as or different from one another and each represent a hydrogen atom, a methyl group, or an ethyl group).

Among these, $R^3$ preferably represents a group represented by —$CH_2R^7$ or —$CH_2OR^7$ (where $R^7$ represents an organic group having one or more carbon atoms. Incidentally, the organic group of $R^7$ preferably represents a hydrocarbon group which may have a substituent.) and particularly preferably represents a group represented by —$CH_2OR^8$ (where $R^8$ represents an aryl group which may have a substituent.).

The curing agent 2 which is encapsulated in a microcapsule is a latent curing agent which is encapsulated in a microcapsule and cures the epoxy resin to be contained in the thermosetting resin composition (C) of the present invention, and the outer layer of the microcapsule is preferably composed of a crosslinked polymer.

As the curing agent 2 which is encapsulated in a microcapsule, a master batch in which the curing agent 2 which is encapsulated in a microcapsule is dispersed in an epoxy resin may be used. The epoxy resin serving as a dispersion medium is preferably a bisphenol A type epoxy resin or a bisphenol F type epoxy resin from the viewpoint of stability of the microcapsule.

The method for producing the curing agent 2 which is encapsulated in a microcapsule by encapsulating an imidazole derivative in a microcapsule is not particularly limited, but it is preferable to use an interfacial polymerization method, an in situ polymerization method, or a phase separation method from an organic solution system from the viewpoint of uniformity of the shell layer of the microcapsule.

Among the imidazole derivatives, the imidazole derivative represented by Formula (2) above functions as a low temperature curing agent for the epoxy resin and can cure the thermosetting resin composition (C) in a short time by being blended in the thermosetting resin composition (C) in combination with a urea derivative to be contained in an epoxy resin curing accelerator to be described later.

In addition, in the case of conducting high cycle press molding, the resin composition excessively flows out from the mold in some cases depending on the structure of the mold since the resin viscosity generally decreases with an increase in the temperature of the resin composition.

By containing the curing agent 2 which is encapsulated in a microcapsule in the resin composition as the thermosetting resin composition (C) of the present invention, the curing reaction of the resin contained in the resin composition starts at a low temperature, namely, from 70° C. to 110° C. and the crosslinking reaction of the thermosetting resin composition (C) rapidly proceeds during an increase in the resin temperature, namely, from a state in which the resin temperature is as low as about from 70° C. to 110° C., thus a decrease in the resin viscosity is suppressed and outflow of the resin from the mold can be suppressed. For this reason, the fibers are not exposed by resin withering or fiber meandering due to excessive flow of resin does not occur on the surface of a molded body to be obtained but a resin layer can be formed on the surface of the molded body and thus a molded body exhibiting favorable molding appearance is likely to be obtained.

Examples of the imidazole derivative represented by Formula (2) above may include 1-(2-hydroxy-3-phenoxypropyl)-2-methylimidazole and an adduct compound to be obtained by reacting a glycidyl ether type epoxy resin with 2-methylimidazole.

Among these, an imidazole derivative to be obtained by reacting an aryl glycidyl ether type epoxy resin with 2-methylimidazole is preferable since it can improve the mechanical properties of a cured product of the thermosetting resin composition (C) of the present invention.

The curing agent 2 which is encapsulated in a microcapsule may be used singly, or two or more kinds thereof may be used in combination.

The curing agent 2 which is encapsulated in a microcapsule is preferably one that exhibits heat latent property as well as has a function of curing the thermosetting resin composition (C) at 100° C. or lower. Here, the "heat latent property" means a property that the curing agent 2 is not reactive with an epoxy resin before a thermal history is given thereto but it is highly reactive with the epoxy resin even at a low temperature after a thermal history has been given thereto at a certain temperature or higher for a certain time or longer.

Examples of commercially available products of the curing agent 2 which is encapsulated in a microcapsule may include Novacure (registered trademark) HX3721, HX3722, HX3742, and HX3748 manufactured by Asahi Kasei E-materials Corporation, which are a curing agent master batch containing this, but the examples are not limited thereto.

The content (however, it means the content of the contents encapsulated in microcapsules including an imidazole derivative but it does not include the mass of the microcapsules.) of the curing agent 2 which is encapsulated in a microcapsule in 100% by mass of the thermosetting resin composition (C) of the present invention is preferably from 1% to 3% by mass, more preferably from 1% to 2.8% by mass, and still more preferably from 1% to 2.5% by mass.

By setting the content of the curing agent 2 which is encapsulated in a microcapsule to be equal to or higher than the lower limit value, it is easy to increase the curing reaction rate of the thermosetting resin composition (C) and to suppress outflow of the resin composition from the mold at the time of curing. By setting the content of the curing agent 2 which is encapsulated in a microcapsule to be equal to or lower than the upper limit value, a cured product of the thermosetting resin composition (C) having a high glass transition temperature is likely to be obtained.

(Epoxy Resin Curing Accelerator)

The epoxy resin curing accelerator to be contained in the thermosetting resin composition (C) of the present invention contains a urea derivative.

[Urea Derivative]

The urea derivative to be contained in the thermosetting resin composition (C) of the present invention functions as a curing accelerator for the epoxy resin to be contained in the thermosetting resin composition (C) of the present invention and can cure the thermosetting resin composition (C) in a short time by being blended in the thermosetting resin composition (C) in combination with the curing agent 2 which is encapsulated in a microcapsule.

As the urea derivative, a compound having a dimethyl ureido group is preferable.

The compound having a dimethyl ureido group is not particularly limited as long as it generates an isocyanate group and dimethylamine by being heated at a high temperature and these activate the epoxy group, but examples thereof may include an aromatic dimethyl urea in which a dimethyl ureido group is bonded to an aromatic ring and an aliphatic dimethyl urea in which a dimethyl ureido group is bonded to an aliphatic compound.

Among these, an aromatic dimethyl urea is preferable from the viewpoint of a faster curing rate.

Specific examples thereof may include 3-phenyl-1,1-dimethylurea (PDMU), 3-(3,4-dichlorophenyl)-1,1-dimethylurea (DCMU), and 3-(3-chloro-4-methylphenyl)-1,1-dimethylurea, and 2,4-bis(3,3-dimethylureido)toluene (TBDMU). Among these, 3-phenyl-1,1-dimethylurea and 2,4-bis(3,3-dimethylureido)toluene are preferable since these exhibit particularly high curability and further accelerate the curing reaction of the epoxy resin contained in the thermosetting resin composition (C) of the present invention.

The urea derivative may be used singly, or two or more kinds thereof may be used in combination.

Among the urea derivatives, 3-phenyl-1,1-dimethylurea and 2,4-bis(3,3-dimethylureido)toluene described above are usually a crystalline solid under a condition of room temperature (25° C.) and exhibit low solubility in an epoxy resin at 100° C. or lower. Hence, it is preferable that the urea derivative is a powder having a volume average particle diameter of 100 μm or less, particularly 20 μm or less.

When the volume average particle diameter of the urea derivative is equal to or smaller than the upper limit value, the urea derivative can be favorably dispersed in the thermosetting resin composition (C) and can accelerate the curing reaction.

Incidentally, the volume average particle diameter can be measured in the same manner as that for the volume average particle diameter of the imidazole-based curing agent 1 described above.

Examples of commercially available products of 3-phenyl-1,1-dimethylurea may include OMICURE (registered trademark) 94 manufactured by Emerald Performance Materials.

Examples of commercially available products of 2,4-bis (3,3-dimethylureido)toluene may include OMICURE (registered trademark) 24 manufactured by Emerald Performance Materials.

Both of them are not limited to these.

The content of the urea derivative in 100% by mass of the thermosetting resin composition (C) of the present invention is preferably from 2% to 5% by mass, more preferably from 2% to 4.5% by mass, still more preferably from 2% to 4% by mass, particularly preferably from 2% to 3.5% by mass, and most preferably from 2% to 3% by mass.

By setting the content of the urea derivative to be equal to or higher than the lower limit value, it is easy to increase the curing reaction rate of the thermosetting resin composition (C) and to suppress the outflow of the resin composition from the mold at the time of curing. By setting the content of the urea derivative to be equal to or lower than the upper limit value, it is easy to maintain high heat resistance of a cured product of the thermosetting resin composition (C).

(Arbitrary Components)

In the thermosetting resin composition (C) of the present invention, "other curing agents" which do not correspond to any of the imidazole-based curing agent 1, the curing agent 2 which is encapsulated in a microcapsule, and the urea derivative may be concurrently used in a range in which the gist of the present invention is not impaired.

However, it is generally required to add only a small amount of "other curing agents" which exhibit excellent curability at a low temperature since the "other curing agents" shorten the life of a resin film formed using the thermosetting resin composition (C), namely, the period of time during which the resin film can be stored while maintaining the tackiness and flexibility.

In addition, the thermosetting resin composition (C) of the present invention may contain various kinds of additives, resins, fillers and the like in a range in which the gist of the present invention is not impaired.

<Prepreg>

The prepreg of the present invention is obtained by impregnating a reinforcing fiber substrate with the thermosetting resin composition (C) of the present invention.

(Reinforcing Fiber Substrate)

As the reinforcing fiber substrate, a reinforcing fiber substrate to be used in a usual fiber-reinforced composite material including a fiber-reinforced plastic molded body, such as a glass fiber, a carbon fiber, an aramid fiber, or a boron fiber can be used in a usually used aspect.

As the reinforcing fiber substrate, a glass fiber and a carbon fiber are preferable, a glass fiber is more preferable as an aspect, and a carbon fiber is more preferable as another aspect.

In addition, as the reinforcing fiber substrate to be contained in the prepreg of the present invention, the same one as a reinforcing fiber substrate (A) to be described later can be used.

The content of the thermosetting resin composition (C) of the present invention in 100% by mass of the prepreg of the present invention is preferably from 15% to 80% by mass, more preferably from 20% to 60% by mass, and still more preferably from 25% to 45% by mass.

When the content of the thermosetting resin composition (C) of the present invention in the prepreg of the present invention is equal to or higher than the lower limit value, the shape of the prepreg in which the reinforcing fiber substrate (A) is impregnated with the thermosetting resin composition (C) is likely to be maintained. When the content of the thermosetting resin composition (C) of the present invention in the prepreg of the present invention is equal to or lower than the upper limit value, the proportion of reinforcing fibers in the prepreg can be maintained high and thus the mechanical properties of a composite material to be obtained through curing are high.

<Method for Producing Fiber-Reinforced Plastic Molded Body>

The method for producing a fiber-reinforced plastic molded body of the present invention is a method for producing a fiber-reinforced plastic molded body, which includes producing a film laminate (F) by laminating a resin film formed using a thermosetting resin composition (C) on at least one surface of a prepreg laminate (E) obtained by laminating a plurality of sheet-like prepreg substrates formed by impregnating a reinforcing fiber substrate (A) with a thermosetting resin composition (B) and subjecting the laminate obtained to a heat and pressure treatment using a mold, and in which the thermosetting resin composition (C) of the present invention is used as the thermosetting resin composition (C).

In detail, the method for producing a fiber-reinforced plastic molded body of the present invention includes the following lamination step and molding step.

Lamination Step:

A step of producing a film laminate (F) by laminating a resin film formed using a thermosetting resin composition (C) on at least one surface of a prepreg laminate (E) obtained by laminating a plurality of sheet-like prepreg substrates formed by impregnating a reinforcing fiber substrate (A) with a thermosetting resin composition (B).

Molding Step:

A step of subjecting the laminate obtained to a heat and pressure treatment using a mold.

(Lamination Step)

In the lamination step, a sheet-like prepreg substrate in which a reinforcing fiber substrate (A) is impregnated with a thermosetting resin composition (B) and a resin film formed using a thermosetting resin composition (C) are used.

In the lamination step, the resin film is laminated on at least one surface of a prepreg laminate (E) in which a plurality of sheet-like prepreg substrates are laminated. In other words, in the production method of the present invention, the resin film may be laminated only on one surface (namely, the surface of one outermost layer) of the prepreg laminate (E) or the resin film may be laminated on both surfaces (namely, the surfaces of both outermost layers) of the prepreg laminate (E).

In the case of laminating the resin film only on one surface of the prepreg laminate (E), a plurality of sheet-like prepreg substrates are laminated to obtain the prepreg laminate (E) and the resin film is further laminated on the surface of the outermost layer of the prepreg laminate (E) to obtain the film laminate (F).

The operation of laminating a plurality of prepreg substrates and the operation of laminating the prepreg laminate (E) and the resin film may be conducted outside the mold to be used in the molding step or in the mold.

[Film Laminate (F)]

In the film laminate (F) to be used in the present invention, the resin film is laminated on at least one surface of the prepreg laminate (E) in which a plurality of prepreg substrates are laminated. For example, as illustrated in FIG. 1, a resin film 14 is further laminated on a prepreg laminate (E) 12 in which a plurality of sheet-like prepreg substrates 10 are laminated to obtain a film laminate (F) 1.

[Prepreg Substrate]

The prepreg substrate to be used in the present invention is a sheet-like prepreg substrate obtained by impregnating the reinforcing fiber substrate (A) with the thermosetting resin composition (B).

The reinforcing fiber constituting the reinforcing fiber substrate (A) is not particularly limited, and for example, an inorganic fiber, an organic fiber, a metal fiber, and a reinforcing fiber having a hybrid configuration in which these are combined can be used.

Examples of the inorganic fiber may include a carbon fiber, a graphite fiber, a silicon carbide fiber, an alumina fiber, a tungsten carbide fiber, a boron fiber, and a glass fiber.

Examples of the organic fiber may include an aramid fiber, a high density polyethylene fiber, other general nylon fibers, and a polyester fiber. Examples of the metal fiber may include fibers of stainless steel and iron, and a carbon fiber coated with a metal may also be used. Among these, a carbon fiber is preferable when the mechanical properties such as strength of the fiber-reinforced plastic molded body are taken into consideration.

The reinforcing fiber of the reinforcing fiber substrate (A) may be a long fiber or a short fiber, and a long fiber is preferable from the viewpoint of excellent rigidity. Examples of a form of the reinforcing fiber substrate may include a form in which a large number of long fibers are aligned in one direction to form a UD sheet (unidirectional sheet), a form in which long fibers are woven into a cloth material (woven fabric), and a form in which a nonwoven fabric made of short fibers is formed.

Examples of a method for weaving the cloth material may include plain weave, twill weave, satin weave, and triaxial weave.

The fiber areal weight of the reinforcing fiber substrate (A) is preferably from 50 to 800 g/m$^2$ and more preferably from 75 to 300 g/m$^2$. It is preferable that the fiber areal weight of the reinforcing fiber substrate (A) is equal to or more than the lower limit value of the above range since the number of laminated layers required for obtaining a molded body having a desired thickness is not great. It is preferable that the fiber areal weight of the reinforcing fiber substrate (A) is equal to or less than the upper limit value of the above range since it is easy to obtain a prepreg substrate in a favorable impregnated state.

Examples of the thermosetting resin (b1) to be used in the thermosetting resin composition (B) may include an epoxy resin, a vinyl ester resin, an unsaturated polyester resin, a polyimide resin, a maleimide resin, and a phenol resin. In the case of using a carbon fiber as the reinforcing fiber substrate (A), an epoxy resin or a vinyl ester resin is preferable and an epoxy resin is particularly preferable from the viewpoint of adhesive property with the carbon fiber.

The thermosetting resin (b1) may be used singly, or two or more kinds thereof may be used in combination.

It is preferable that the thermosetting resin composition (B) contains a curing agent in addition to the thermosetting resin (b1).

For example, in a case in which the thermosetting resin (b1) is an epoxy resin, the curing agent is not particularly limited but dicyandiamide or an imidazole-based curing agent can be suitably used.

It is preferable that the thermosetting resin composition (B) further contains a curing auxiliary in addition to the thermosetting resin (b1) and the curing agent.

For example, in a case in which the thermosetting resin (b1) is an epoxy resin, the curing auxiliary is not particularly limited but a urea compound can be suitably used.

In addition, the thermosetting resin composition (B) may contain additives such as inorganic fine particles.

The viscosity of the thermosetting resin composition (B) at 30° C. is preferably from $1.0 \times 10^2$ to $1.0 \times 10^5$ Pa·s, more preferably $5.0 \times 10^2$ to $9.8 \times 10^4$ Pa·s, and still more preferably $1.0 \times 10^3$ to $9.7 \times 10^4$ Pa·s.

When the viscosity of the thermosetting resin composition (B) is equal to or higher than the lower limit value, the prepreg substrate exhibits excellent handling properties and work such as fabrication and lamination of the prepreg substrate and molding are facilitated. When the viscosity of the thermosetting resin composition (B) is equal to or lower than the upper limit value, the reinforcing fiber substrate (A) is easily impregnated with the thermosetting resin composition (B), excessive heating is not required at the time of impregnation, and the draping property of the prepreg substrate is also hardly impaired.

Examples of the prepreg substrate may include a cloth prepreg substrate in which the reinforcing fiber substrate (A) in which reinforcing fibers are woven in the biaxial direction is impregnated with the thermosetting resin composition (B) and a prepreg substrate (UD prepreg substrate) in which the reinforcing fiber substrate (A) in which reinforcing fibers are aligned in one direction is impregnated with the thermosetting resin composition (B). In addition, one in which the reinforcing fibers in the prepreg substrate are shortly cut by making a cut into the prepreg substrate in which the reinforcing fiber substrate (A) in which reinforcing fibers are aligned in one direction is impregnated with the thermosetting resin composition (B) may also be used.

The fiber length of the reinforcing fiber in the prepreg substrate is preferably 12.7 mm or longer and more preferably 25.4 mm or longer. When the fiber length of the reinforcing fiber is equal to or longer than the lower limit value, the mechanical properties of the fiber-reinforced plastic molded body are likely to be sufficiently high.

The laminated configuration of the prepreg laminate (E) is not particularly limited. Examples thereof may include a configuration in which the respective UD prepreg substrates are laminated so that the fiber axes of the reinforcing fibers of the UD prepreg substrates vertically adjacent to each other are orthogonal to each other in the case of using a UD prepreg substrate. In the prepreg laminate (E), only the same kind of prepreg substrate may be laminated or different kinds of prepreg substrates may be laminated.

The number of laminated prepreg substrates is not particularly limited and can be appropriately determined according to the properties of fiber-reinforced composite material required and the like.

[Resin Film]

The resin film to be used in the present invention is a resin film formed using the thermosetting resin composition (C) of the present invention.

It is preferable that the resin film contains a reinforcing fiber substrate (D) having a fiber areal weight of 50 g/m$^2$ or less.

This makes it possible to further increase the mechanical strength while suppressing the generation of molding appearance defects such as resin withering and fiber meandering on the surface of the fiber-reinforced plastic molded body.

The reinforcing fiber constituting the reinforcing fiber substrate (D) is not particularly limited, and examples thereof may include the same ones as those mentioned for the reinforcing fiber substrate (A).

The reinforcing fiber substrate (D) is often in a state in which the elongated reinforcing fiber substrate (D) is wound in a roll form and used while being drawn out from that state. In this case, the reinforcing fiber substrate is likely to shrink in the width direction by the tension when being drawn out from the rolled state. As the reinforcing fiber of the reinforcing fiber substrate (D), it is preferable to use a reinforcing fiber which hardly causes shrinkage of the substrate in the width direction even in the case of being drawn out from the rolled state and used and exhibits low water absorbing property. Specifically, a carbon fiber or a glass fiber is preferable as the reinforcing fiber of the reinforcing fiber substrate (D).

The reinforcing fiber of the reinforcing fiber substrate (D) may be a long fiber or a short fiber.

Examples of the form of the reinforcing fiber substrate (D) may include a form in which a large number of long fibers are aligned in one direction to form a UD sheet (unidirectional sheet), a form in which long fibers are woven into a cloth material (woven fabric), and a form in which a nonwoven fabric are made of short fibers. Among these, a nonwoven fabric made of reinforcing fibers is preferable as the reinforcing fiber substrate (D) from the viewpoint of easily obtaining a fiber-reinforced plastic exhibiting excellent surface smoothness.

The upper limit value of fiber areal weight of the reinforcing fiber substrate (D) is 50 g/m$^2$, and it is preferably smaller than the fiber areal weight of the reinforcing fiber substrate (A) to be used in the prepreg substrate, more preferably 30 g/m$^2$, and still more preferably 15 g/m$^2$. The lower limit value of the fiber areal weight of the reinforcing fiber substrate (D) is preferably 1 g/m$^2$. For example, the fiber areal weight of the reinforcing fiber substrate (D) is preferably from 1 to 50 g/m$^2$, more preferably from 1 to 30 g/m$^2$, and still more preferably from 1 to 10 g/m$^2$.

When the fiber areal weight of the reinforcing fiber substrate (D) is equal to or more than the lower limit value, the production of the reinforcing fiber substrate (D) is likely to be facilitated. When the fiber areal weight of the reinforcing fiber substrate (D) is equal to or less than the upper limit value, it is easy to suppress a defect that the reinforcing fiber substrate (D) is seen through the surface of the molded body.

At the time of molding, the resin contained in the prepreg and resin film is allowed to flow and thus the voids are removed.

In a case in which the resin film contains the reinforcing fiber substrate (D) including a nonwoven fabric, the resin flow at the time of molding is suppressed by the reinforcing fiber substrate (D) including a nonwoven fabric, but resin flow suppression by the reinforcing fiber substrate (D) including a nonwoven fabric hardly occurs and the resin is likely to flow when the amount of resin is increased.

Hence, when the fiber areal weight of the reinforcing fiber substrate (D) including a nonwoven fabric is thickened, the resin content in the resin film concomitantly increases but resin withering due to resin flow is likely to occur.

On the other hand, when the resin content in the resin film is relatively decreased in a case in which the fiber areal weight of the reinforcing fiber substrate (D) including a nonwoven fabric is increased, resin withering due to shortage of resin is likely to occur.

Accordingly, by setting the fiber areal weight of the reinforcing fiber substrate (D) including a nonwoven fabric to be equal to or less than the upper limit value, it is possible to control the amount of resin contained in the resin film to a proper amount, and as a result, to prevent resin withering at the time of molding and to improve the surface appearance of the molded body. In addition, it is possible to properly adjust the thickness of the resin layer remaining on the surface and to suppress an increase in weight and a decrease in bending property. Furthermore, it is possible to favorably maintain the painting appearance even in the case of being exposed to a wet heat condition since the number of voids remaining in the nonwoven fabric after molding decreases.

In a case in which the resin film contains the reinforcing fiber substrate (D), the fiber length of the reinforcing fiber in the resin film is preferably from 5 to 50 mm and more preferably from 10 to 30 mm.

When the fiber length of the reinforcing fiber in the resin film is equal to or longer than the lower limit value, the mechanical properties of the fiber-reinforced plastic molded body are likely to be sufficiently high. When the fiber length of the reinforcing fiber in the resin film is equal to or shorter than the upper limit value, the moldability of the film laminate (F) is improved.

In a case in which the resin film contains the reinforcing fiber substrate (D), the fiber volume content rate in the resin film is preferably 50% by volume or more and more preferably 70% by volume or more.

When the fiber volume content rate in the resin film is equal to or higher than the lower limit value, the mechanical properties of the fiber-reinforced plastic molded body are likely to be sufficiently high.

Incidentally, the fiber volume content rate in the resin film means a value to be measured by the same method as that for the fiber volume content rate in the prepreg substrate.

In a case in which the resin film contains the reinforcing fiber substrate (D), the resin content in the resin film is preferably higher than that in the reinforcing fiber substrate (D), more preferably from 30 to 500 g/m$^2$, still more preferably from 40 to 300 g/m$^2$, and particularly preferably from 50 to 150 g/m$^2$.

When the resin content in the resin film is equal to or higher than the lower limit, the reinforcing fiber substrate (D) is hardly exposed onto the surface of the molded body and a fiber-reinforced plastic molded body exhibiting excellent surface smoothness is likely to be obtained. When the resin content in the resin film is equal to or lower than the upper limit value, handling of the resin film is likely to be facilitated.

The thickness of the resin film is preferably from 20 to 400 μm and more preferably from 40 to 300 μm.

When the thickness of the resin film is equal to or thicker than the lower limit value, shielding property of the fiber on the surface of the molded body is excellent. When the thickness of the resin film is equal to or thinner than the upper limit value, the thickness of the molded body is less likely to be unnecessarily thick.

The number of the resin films laminated on one surface of the prepreg laminate (E) is not particularly limited, and it may be one or two or more.

Incidentally, the resin film to be used in the present invention may be a resin film which does not contain the reinforcing fiber substrate (D).

(Molding Step)

In the molding step, the laminate obtained, for example, the film laminate (F) obtained in the lamination step is subjected to a heat and pressure treatment using a mold to obtain a fiber-reinforced plastic molded body.

As a molding method by a heat and pressure treatment using a mold, a known molding method can be adopted, and examples thereof may include autoclave molding, oven molding, internal pressure molding, and press molding.

In press molding, it is easy to obtain a fiber-reinforced plastic molded body having a resin layer formed of a resin film on the surface layer but the molding pressure is high and the resin tends to flow out of the mold as compared to other molding methods. Hence, the present invention, in which outflow of resin from the mold at the time of molding can be suppressed, is more advantageous in the case of adopting press molding in the molding step and particularly advantageous in the case of adopting high cycle press molding.

Figure 2:
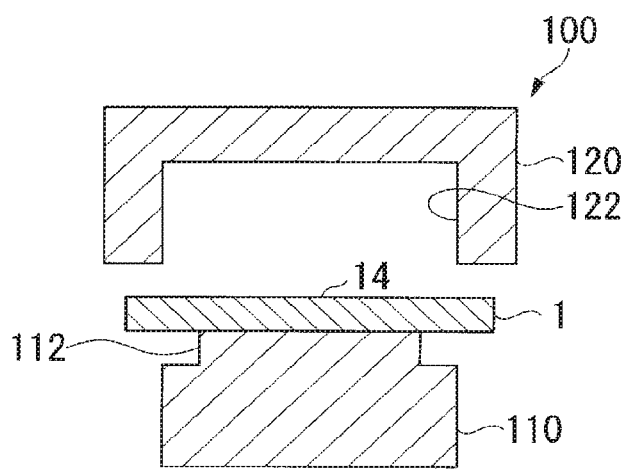
FIG. 2 is a cross-sectional view illustrating an example of a molding step in a method for producing a fiber-reinforced plastic molded body of the present invention.
Figure 2:
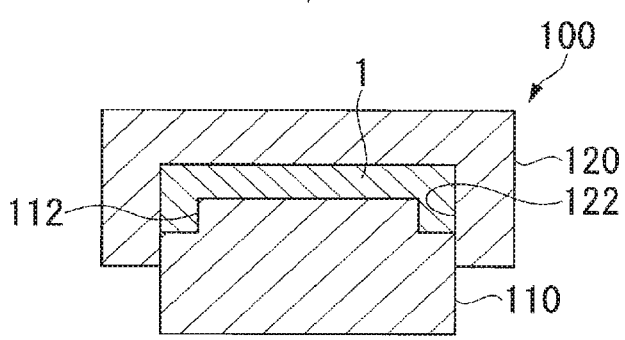
Figure 2:
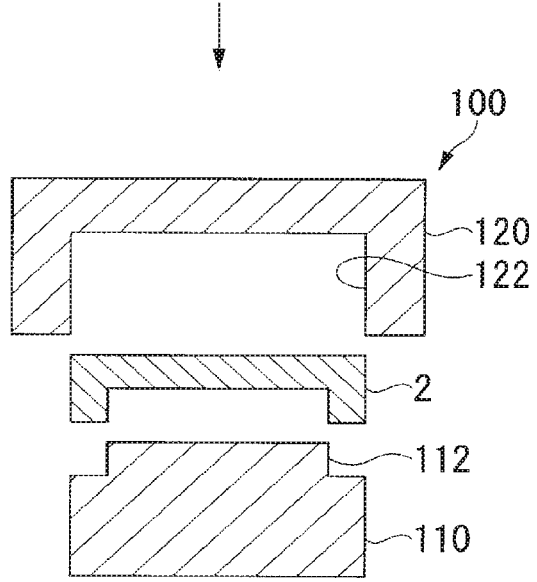

For example, a case in which a film laminate (F) 1 is press molded by using a mold 100 and which is illustrated in FIG. 2 will be described.

The mold 100 includes a lower mold 110 provided with a convex portion 112 on the upper surface side and an upper mold 120 provided with a concave portion 122 on the lower surface side. When the upper mold 120 is brought close to the lower mold 110 to close the mold 100, a cavity having a shape complementary to the shape of the intended fiber-reinforced plastic molded body is formed between the convex portion 112 and the concave portion 122 in the mold 100.

As illustrated in FIG. 2(a), the film laminate (F) 1 is disposed on the convex portion 112 of the lower mold 110 of the heated mold 100 so that a resin film 14 faces upward.

Subsequently, as illustrated in FIG. 2(b), the upper mold 120 is brought close to the lower mold 110 to close the mold 100, and the film laminate (F) 1 is molded by being subjected to a heat and pressure treatment. The thermosetting resin composition (B) and the thermosetting resin composition (C) in the laminate 1 cure while flowing by being heated while being pressurized by the mold 100. At this time, excessive flow of the thermosetting resin composition (C) is suppressed as the curing agent 2 which is encapsulated in a microcapsule and the urea derivative are contained in the resin film 14, thus the thermosetting resin composition (C) is prevented from flowing out from the edge portion of the mold 100, and it is possible to prevent excessive outflow of the thermosetting resin composition (C).

After curing, as illustrated in FIG. 2(c), the mold 100 is opened and a fiber-reinforced plastic molded body 2 is taken out therefrom.

As the molding conditions, known molding conditions can be adopted except that the laminate contains the thermosetting resin composition (C) of the present invention.

The temperature at the time of molding (the temperature of the mold in the case of using a mold) is preferably from 100° C. to 180° C. and more preferably from 120° C. to 160° C.

It is preferable to conduct heating at a temperature equal to or higher than the lower limit value at the time of molding since it is possible to conduct curing in a short time and to shorten the molding cycle. By conducting heating at a temperature equal to or lower than the upper limit value at the time of molding, resin flow at the time of molding is suppressed and a molded body having favorable appearance is likely to be obtained.

The surface pressure at the time of molding is preferably from 1 to 15 MPa and more preferably from 4 to 10 MPa.

By applying a pressure equal to or higher than the lower limit value at the time of molding, the resin flows and the resin composition spreads to every corner of the mold and thus a molded body having favorable appearance is likely to be obtained. By applying a pressure equal to or lower than the upper limit value at the time of molding, it is easy to prevent the resin from excessively flowing and the molding appearance from deteriorating.

The molding time is preferably from 1 to 15 minutes and more preferably from 2 to 5 minutes.

By conducting molding for a time equal to or longer than the lower limit value, it is possible to use a resin composition having excellent storage stability. By conducting molding for a time equal to or shorter than the upper limit value, high cycle press molding is possible.

(Shaping Step)

The shaping step is a step of shaping the film laminate (F) obtained in the lamination step to produce a preform.

In the production method of the present invention, a shaping step may be conducted subsequently to the lamination step, that is, the film laminate (F) obtained in the lamination step may be shaped to produce a preform and the preform obtained may be subjected to a molding step as a laminate.

In other words, the production method of the present invention may be a method in which the lamination step, the shaping step, and the molding step are conducted in this order. In this case, the film laminate (F) obtained in the lamination step is shaped in the shaping step to obtain a preform and then the preform obtained is molded by being subjected to a heat and pressure in the molding step to produce a fiber-reinforced plastic.

The method for shaping the film laminate (F) may be any method as long as it is possible to shape an intermediate shape based on the shape of the intended fiber-reinforced plastic molded body, and a known method can be adopted except that the film laminate (F) containing the thermosetting resin composition (C) of the present invention is used.

In the method for producing a fiber-reinforced plastic molded body of the present invention described above, the film laminate (F) in which the resin film formed using the thermosetting resin composition (C) of the present invention is laminated on the surface of the prepreg laminate (E) is used. Excessive flow of the thermosetting resin composition (C) in the mold at the time of molding is suppressed as the imidazole-based curing agent 1 which is not encapsulated in a microcapsule, the curing agent 2 which is encapsulated in a microcapsule, and the urea derivative are contained in the resin film. By this, a phenomenon that the thermosetting resin composition (C) contained in the resin film flows out of the mold is suppressed even in the case of adopting high-cycle press molding. For this reason, the generation of molding appearance defects such as resin withering and fiber meandering on the surface of a fiber-reinforced plastic molded body to be obtained is suppressed.

In addition, in the method for producing a fiber-reinforced plastic molded body of the present invention, a resin film is laminated on the surface of the prepreg laminate (E) and molding is then conducted and thus a defect that the fibers are seen through the surface of a fiber-reinforced plastic molded body to be obtained is also suppressed.

[Fiber-Reinforced Plastic Molded Body]

An aspect of the fiber-reinforced plastic molded body of the present invention is a cured product of the film laminate (F) obtained in the lamination step or the preform obtained in the shaping step, and the film laminate (F) obtained in the lamination step or the preform obtained in the shaping step is molded by being subjected to a heat and pressure treatment as described above.

The fiber-reinforced plastic molded body of the present invention of the present aspect includes a composite material portion formed of the prepreg laminate (E) and a resin layer formed of the resin film on the surface of the composite material portion. The composite material portion contains a cured product of the reinforcing fiber substrate (A) and the thermosetting resin composition (B), and the resin layer contains a cured product of the thermosetting resin composition (C) of the present invention and the reinforcing fiber substrate (D) to be used if necessary.

Figure 3:
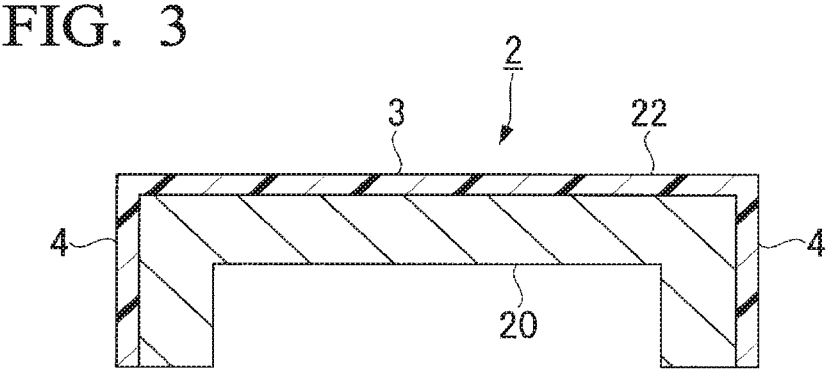
FIG. 3 is a cross-sectional view illustrating an example of a fiber-reinforced plastic molded body of the present invention.

For example, as illustrated in FIG. 3, the fiber-reinforced plastic molded body 2 obtained by molding the film laminate (F) using the mold 100 includes a composite material portion 20 formed of a prepreg laminate 12 and a resin layer 22 formed of a resin film 14 on the surface of the composite material portion 20. The composite material portion 20 contains a cured product of the reinforcing fiber substrate (A) and the thermosetting resin composition (B). The resin layer 22 contains a cured product of the thermosetting resin composition (C) and the reinforcing fiber substrate (D) to be used if necessary.

The fiber-reinforced plastic molded body 2 illustrated in FIG. 3 has an aspect in which a side portion 4 vertically extends from both ends of a flat plate portion 3 toward the side opposite to the resin layer 22.

In addition, another aspect of the fiber-reinforced plastic molded body of the present invention is a cured product of the prepreg of the present invention, and the cured product is obtained by laminating a plurality of the prepregs of the present invention if necessary and curing the laminate by adopting a usual method for curing a prepreg.

The fiber-reinforced plastic molded body of the present invention of the present aspect contains a reinforcing fiber substrate and a cured product of the thermosetting resin composition (C) of the present invention.

Incidentally, when a plurality of the prepregs of the present invention are laminated, it is possible to adopt the same aspect as that of the prepreg laminate (E) in which a plurality of prepreg substrates are laminated described above.

The shape and size of the fiber-reinforced plastic molded body of the present invention are not particularly limited and can be appropriately determined according to the application.

In the fiber-reinforced plastic molded body of the present invention, excessive flow of the thermosetting resin composition (C) contained in the resin film at the time of molding is suppressed and thus the generation of molding appearance defects such as resin withering and fiber meandering on the surface and a defect that fibers are seen through the surface are suppressed.

EXAMPLES

Hereinafter, the present invention will be described in detail with reference to Examples, but the present invention is not limited by the flowing description.

(Measurement of Viscosity of Thermosetting Resin Composition (C))

The viscosity of the thermosetting resin composition (C) was measured under the following conditions.

Incidentally, the temperature at which the lowest viscosity is attained means the temperature of the thermosetting resin composition (C) when the lowest viscosity is measured in the case of measuring the viscosity by the following method.

Apparatus: Rheometer ("VAR-100" manufactured by TA Instruments)
Plate used: 25 φ parallel plate
Plate gap: 0.5 mm
Frequency for measurement: 10 rad/s
Rate of temperature increase: 2.0° C./min
Measurement-started temperature: 30° C.
Stress: 300 Pa (Measurement of Dynamic Viscoelasticity of Cured Product)

The cured resin plate obtained in the following "Fabrication of cured resin plate" was processed into a test piece (length 55 mm×width 12.5 mm), log G' was plotted with respect to the temperature at a frequency for measurement of 1 Hz and a rate of temperature increase of 5° C./min by using a rheometer (ARES-RDA manufactured by TA Instruments), and the temperature at the intersection point of the approximate straight line in the flat region of log G' with the approximate straight line in the region in which log G' drastically decreases was taken as the glass transition temperature (G' Tg) of the cured product to be attained by dynamic viscoelasticity measurement.

[Fabrication of Cured Resin Plate]

The thermosetting resin composition (C) obtained in each example was injected between two 4 min thick glass plates sandwiching a 2 mm thick polytetrafluoroethylene spacer, heated in a hot air circulating type constant temperature oven for 5 minutes under the condition that the temperature of the surface of the glass plate was 140° C., and then cooled to obtain a cured resin plate.

(Evaluation on Molding Appearance)

The surface on the resin film disposed side of the molded plate obtained in each example was visually evaluated according to the following criteria.

[Evaluation Criteria]

A: Resin withering, fiber meandering, and defect that fibers are seen through the surface are not observed.

B: Smoothness of surface is slightly inferior but resin withering, fiber meandering, and lack of hiding of fiber are not observed.

C: Resin withering, fiber meandering, and lack of hiding of fiber are partially observed.

D: Resin withering, fiber meandering, and lack of hiding of fiber are totally observed.

(Evaluation on Painting Appearance after Wet Heat Test)

An acrylic urethane black paint was spray painted on the surface on the resin film disposed side of the molded plate obtained in each example so as to have a coating film thickness of about 80 μm. This was held for 240 hours under conditions of 50° C. and 95% RH, and the surface of the coating film was visually evaluated according to the following criteria.

[Evaluation Criteria]

A: Streaky appearance defects are not observed.

B: Streaky appearance defects are observed.

(Raw materials used)

The raw materials used in the present Example are presented below.

[Epoxy Resin (c1)]

c1-1: Reaction product of epoxy resin with 4,4'-diaminodiphenylsulfone (produced according to the following "Production of epoxy resin (c1-1)").

c1-2: Bisphenol A type epoxy resin (product name "jER 828", weight per epoxy equivalent: 189 manufactured by Mitsubishi Chemical Corporation).

c1-3: Bisphenol S type epoxy resin (product name "EPICLON EXA-1514", weight per epoxy equivalent: 300 manufactured by DIC Corporation).

c1-4: Phenol novolak type epoxy resin (product name "EPICLON N775", weight per epoxy equivalent: 189 manufactured by DIC Corporation).

c1-5: Trisphenolmethane type epoxy resin (product name "jER 1032H60", weight per epoxy equivalent: 169 manufactured by Mitsubishi Chemical Corporation).

c1-6: Diaminodiphenylmethane type epoxy resin (product name "jER 604", weight per epoxy equivalent: 120 manufactured by Mitsubishi Chemical Corporation).

c1-7: Phenol novolak type epoxy resin (product name "jER 152", weight per epoxy equivalent: 177 manufactured by Mitsubishi Chemical Corporation).

Production of Epoxy Resin (c1-1)

A bisphenol A type epoxy resin (product name "jER 828" manufactured by Mitsubishi Chemical Corporation) and 4,4'-diaminodiphenylsulfone (trade name: SEIKACURE-S manufactured by Wakayama Seika Kogyo Co., Ltd.) were mixed together at a mass ratio of 100:9 at room temperature and mixed and heated at 150° C. to obtain an epoxy resin (c1-1). The epoxy resin (c1-1) is a mixture containing a reaction product of an epoxy resin with an amine compound having at least one sulfur atom in the molecule as a main component (weight per epoxy equivalent: 266 g/eq, viscosity (90° C.): 1.3 Pa·S).

[Imidazole-Based Curing Agent 1]

i-1: 2-Phenyl-4-methyl-5-hydroxymethylimidazole (volume average particle diameter: 3.4 µm, product name "CUREZOL (registered trademark) 2P4MHZ-PW" manufactured by SHIKOKU CHEMICALS CORPORATION).

i-2: 2-Phenyl-4,5-dihydroxymethylimidazole (volume average particle diameter: 2.0 µm, product name "CUREZOL (registered trademark) 2PHZ-PW" manufactured by SHIKOKU CHEMICALS CORPORATION).

[Curing Agent 2 Encapsulated in Microcapsule]

h-1: Imidazole-based epoxy resin curing agent master batch (bisphenol A type epoxy resin: 65% by mass, imidazole derivative (curing agent component) represented by Formula (2) above: 35% by mass, gel time at 120° C.: 0.7 minute, product name "Novacure (registered trademark) HX3722" manufactured by Asahi Kasei Corp.).

h-2: Imidazole-based epoxy resin curing agent master batch (bisphenol A type epoxy resin: 65% by mass, imidazole derivative (curing agent component) represented by Formula (2) above: 35% by mass, gel time at 120° C.: 1.1 minutes, product name "Novacure (registered trademark) HX3742" manufactured by Asahi Kasei Corp.).

h-3: Imidazole-based epoxy resin curing agent master batch (bisphenol A type epoxy resin: 65% by mass, imidazole derivative (curing agent component) represented by Formula (2) above: 35% by mass, gel time at 130° C.: 0.5 minute, product name "Novacure (registered trademark) HX3748" manufactured by Asahi Kasei Corp.).

[Urea Derivative]

g-1: 2,4-Bis(3,3-dimethylureido)toluene (TBDMU) (product name "OMICURE 24" manufactured by PTI JAPAN).

g-2: 3-Phenyl-1,1-dimethylurea (PDMU) (product name "OMICURE 94" manufactured by PTI JAPAN).

(Fabrication of Master Batch)

The imidazole-based curing agent 1 or the urea derivative was kneaded with the epoxy resin at the mass ratio presented in Table 1 and then uniformly dispersed by using a triple roll to fabricate a master batch.

TABLE 1

| | | | Master batch | | | | | |
|---|---|---|---|---|---|---|---|---|
| | | | I-1 | I-2 | I-3 | I-4 | G-1 | G-2 |
| Epoxy resin | c1-2 | Parts by mass | 3 | 3 | 25 | 50 | 1 | 1 |
| Imidazole-based curing agent 1 | i-1 | Parts by mass | 2 | | | 8.7 | | |
| | i-2 | Parts by mass | | 2 | 8.7 | | | |
| Urea derivative | g-1 | Parts by mass | | | | | 1 | |
| | g-2 | Parts by mass | | | | | | 1 |

Example 1

In a dissolving tank, 95 parts by mass of the epoxy resin (c1-1) was placed, and the temperature was increased to 60° C., 6 parts by mass of the master batch G-2, 10 parts by mass of the curing agent 2 (h-1) which was encapsulated in a microcapsule, and 21.8 parts by mass of the master batch 1-2 were added thereto, and the mixture was further stirred and mixed at 60° C. to obtain a thermosetting resin composition (C) C-1.

For the thermosetting resin composition (C) C-1 obtained, the temperature at which the lowest viscosity was attained (abbreviated as the "lowest viscosity temperature" in the table) was measured according to the "Measurement of viscosity of thermosetting resin composition (C)".

For the thermosetting resin composition (C) C-1 obtained, the glass transition temperature (abbreviated as the "glass transition point" in the table) of the cured product to be attained by dynamic viscoelasticity measurement was also determined according to the "Dynamic viscoelasticity measurement of cured product".

The results are presented in Table 2.

The thermosetting resin composition (C) C-1 obtained was coated on release paper by using a multi coater model M-500 manufactured by HIRANO TECSEED Co., Ltd. to obtain a sheet with release paper having a resin content of 50 g/m².

The sheet with release paper obtained was laminated so that the release paper of the sheet with release paper faced to a glass fiber nonwoven fabric (10 g/m² manufactured by Oji F-Tex Co., Ltd.) and impregnated under pressure and the release paper was then peeled off from the sheet to obtain a resin film.

The resin film obtained was disposed on the upper surface of a prepreg laminate (E) in which five Pyrofil prepregs (product name "TR361E250S" manufactured by Mitsubishi Chemical Corporation) were laminated so that the fiber axis directions of reinforcing fibers were perpendicular to each other to obtain a film laminate (F).

The film laminate (F) obtained was cut into 300 mm×300 mm, placed in a flat molding mold of 300 mm square, and press-molded under the conditions of a surface pressure of 7.2 MPa, a mold temperature of 140° C., and a molding time of 5 minutes to obtain a fiber-reinforced plastic molded body (also referred to as a "molded plate").

The molded plate obtained was subjected to the evaluation on molding appearance (abbreviated as the "molding appearance" in the table) and the evaluation on painting appearance (abbreviated as the "painting appearance" in the table) after the wet heat test.

The results are presented in Table 2.

Example 2 to Example 7

The thermosetting resin composition (C) C-2 to the thermosetting resin composition (C) C-7 were prepared in the same manner as in Example 1 except that the composition and content of each component were changed as presented in Table 2.

Using the thermosetting resin composition (C) C-2 to thermosetting resin composition (C) C-7 obtained, the temperature at which the lowest viscosity was attained was measured and the glass transition temperature of the cured product to be attained by dynamic viscoelasticity measurement was determined in the same manner as in Example 1.

In addition, resin films were fabricated and fiber-reinforced plastic molded bodies (molded plates) were obtained in the same manner as in Example 1 except that the thermosetting resin composition (C) C-2 to the thermosetting resin composition (C) C-7 were used.

The molded plates obtained were subjected to the evaluation on molding appearance and the evaluation on painting appearance after the wet heat test in the same manner as in Example 1.

The results are presented in Table 2.

Comparative Example 1

A thermosetting resin composition X-1 was prepared in the same manner as in Example 1 except that the master batch I containing the imidazole-based curing agent 1 was not used and the composition and content of each component were changed as presented in Table 3.

Using the thermosetting resin composition X-1 obtained, the temperature at which the lowest viscosity was attained was measured and the glass transition temperature of the cured product to be attained by dynamic viscoelasticity measurement was determined in the same manner as in Example 1.

In addition, a resin film was fabricated and a fiber-reinforced plastic molded body (molded plate) was obtained in the same manner as in Example 1 except that the thermosetting resin composition X-1 was used.

The molded plate obtained was subjected to the evaluation on molding appearance and the evaluation on painting appearance after the wet heat test in the same manner as in Example 1.

The results are presented in Table 3.

Comparative Example 2

A thermosetting resin composition X-2 was prepared in the same manner as in Example 1 except that the curing agent 2 which was encapsulated in a microcapsule was not used and the composition and content of each component were changed as presented in Table 3.

Using the thermosetting resin composition X-2 obtained, the temperature at which the lowest viscosity was attained was measured and the glass transition temperature of the cured product to be attained by dynamic viscoelasticity measurement was determined in the same manner as in Example 1.

In addition, a resin film was fabricated and a fiber-reinforced plastic molded body (molded plate) was obtained in the same manner as in Example 1 except that the thermosetting resin composition X-2 was used.

The molded plate obtained was subjected to the evaluation on molding appearance in the same manner as in Example 1.

The results are presented in Table 3.

Comparative Example 3

A thermosetting resin composition X-3 was prepared in the same manner as in Example 1 except that the masterbatch G containing a urea derivative was not used and the composition and content of each component were changed as presented in Table 3.

Using the thermosetting resin composition X-3 obtained, the temperature at which the lowest viscosity was attained was measured and the glass transition temperature of the cured product to be attained by dynamic viscoelasticity measurement was determined in the same manner as in Example 1.

In addition, a resin film was fabricated and a fiber-reinforced plastic molded body (molded plate) was obtained in the same manner as in Example 1 except that the thermosetting resin composition X-3 was used.

The molded plate obtained was subjected to the evaluation on molding appearance in the same manner as in Example 1.

The results are presented in Table 3.

Incidentally, in the table, the imidazole-based curing agent 1 is abbreviated as the "curing agent 1" and the curing agent 2 which is encapsulated in a microcapsule is abbreviated as the "curing agent 2".

TABLE 2

| | | | | Example | | | | | | |
| --- | --- | --- | --- | --- | --- | --- | --- | --- | --- | --- |
| | | | | 1 | 2 | 3 | 4 | 5 | 6 | 7 |
| Epoxy resin | | c1-1 | Parts by mass | 95 | 95 | 95 | | | | 80 |
| | | c1-3 | Parts by mass | | | | 50 | | | |
| | | c1-4 | Parts by mass | | | | | 50 | | |
| | | c1-5 | Parts by mass | | | | | | 20 | |
| | | c1-6 | Parts by mass | | | | | | 20 | |
| | | c1-7 | Parts by mass | | | | | 40 | 55 | |
| Master batch I | Epoxy resin | c1-2 | Parts by mass | 13.1 | 13.1 | 13.1 | 50 | 13.1 | 13.1 | 21 |
| | Curing agent 1 | i-1 | Parts by mass | | | | 8.7 | 8.7 | 8.7 | 14 |
| | | i-2 | Parts by mass | 8.7 | 8.7 | | | | | 8.7 |
| Master batch G | Epoxy resin | c1-2 | Parts by mass | 3 | 4 | 3 | 3 | 5 | 4 | 3 |
| | Urea derivative | g-1 | Parts by mass | | 4 | | 3 | 5 | | |
| | | g-2 | Parts by mass | 3 | | 3 | | | 4 | 3 |
| Curing agent 2 | | h-1 | Parts by mass | 10 | 8 | 5 | | 10 | 10 | |
| | | h-2 | Parts by mass | | | | 8 | | | |
| | | h-3 | Parts by mass | | | | | | | 5 |

TABLE 2-continued

|  |  |  | Example |  |  |  |  |  |  |
|---|---|---|---|---|---|---|---|---|---|
|  |  |  | 1 | 2 | 3 | 4 | 5 | 6 | 7 |
| Content in resin composition | Curing agent 1 | % by mass | 6.6 | 6.6 | 6.8 | 7.1 | 6.6 | 6.5 | 11.1 |
|  | Curing agent 2 | % by mass | 2.6 | 2.1 | 1.4 | 2.3 | 2.7 | 2.6 | 1.4 |
|  | Urea derivative | % by mass | 2.3 | 3.0 | 2.3 | 2.4 | 3.8 | 3.0 | 2.4 |
| Lowest viscosity temperature |  | ° C. | 92 | 95 | 92 | 95 | 97 | 89 | 98 |
| Glass transition temperature |  | ° C. | 158 | 158 | 163 | 169 | 152 | 162 | 173 |
| Molding appearance |  |  | A | B | A | B | B | B | B |
| Painting appearance |  |  | A | A | A | A | A | A | A |

TABLE 3

|  |  |  |  | Comparative Example |  |  |
|---|---|---|---|---|---|---|
|  |  |  |  | 1 | 2 | 3 |
|  | Epoxy resin | c1-1 | Parts by mass | 95 | 95 | 75 |
| Master batch I | Epoxy resin | c1-2 | Parts by mass |  | 13.1 | 25 |
|  | Curing agent 1 | i-2 | Parts by mass |  | 8.7 | 8.7 |
| Master batch G | Epoxy resin | c1-2 | Parts by mass | 5 | 3 |  |
|  | Urea derivative | g-2 | Parts by mass | 5 | 3 |  |
| Curing agent 2 |  | h-1 | Parts by mass | 10 |  | 10 |
| Content in resin composition | Curing agent 1 |  | % by mass | 0 | 7.1 | 7.3 |
|  | Curing agent 2 |  | % by mass | 3.0 | 0 | 2.9 |
|  | Urea derivative |  | % by mass | 4.3 | 2.4 | 0 |
| Lowest viscosity temperature |  |  | ° C. | 88 | 105 | 107 |
| Glass transition temperature |  |  | ° C. | 141 | 158 | 173 |
| Molding appearance |  |  |  | B | D | D |
| Painting appearance |  |  |  | B | — | — |

As presented in Table 2, in Examples 1 to 7 in which resin films formed using the thermosetting resin compositions (C) C-1 to C-7 of the present invention were used, excessive flow of the thermosetting resin compositions (C) C-1 to C-7 at the time of molding was suppressed, the resin withering, fiber meandering, and lack of hiding of fiber were not observed, and thus molding appearance was excellent. In addition, the glass transition point was 150° C. or higher and thus the painting appearance after the wet heat test was also excellent.

In Comparative Example 1 in which a resin film formed using the thermosetting resin composition X-1 which did not contain the imidazole-based curing agent 1 was used, the glass transition point was lower than 150° C. and thus the painting appearance after the wet heat test was inferior.

In Comparative Example 2 in which a resin film formed using the thermosetting resin composition X-2 which did not contain the curing agent 2 which was encapsulated in a microcapsule was used and Comparative Example 3 in which a resin film formed using the thermosetting resin composition X-3 which did not contain a urea derivative was used, excessive flow of the thermosetting resin composition was not sufficiently suppressed and thus the molding appearance was inferior.

Example 8

A resin film was fabricated and a fiber-reinforced plastic molded body (molded plate) was obtained in the same manner as in Example 1 except that a glass fiber nonwoven fabric (15 g/m² manufactured by Oji F-Tex Co., Ltd.) was used instead of the glass fiber nonwoven fabric (10 g/m² manufactured by Oji F-Tex Co., Ltd.).

The molded plate obtained was subjected to the evaluation on molding appearance and the evaluation on painting appearance after the wet heat test in the same manner as in Example 1.

The results are presented in Table 4.

Example 9

A resin film was fabricated and a fiber-reinforced plastic molded body (molded plate) was obtained in the same manner as in Example 1 except that the resin content in the sheet with release paper was set to 150 g/m².

The molded plate obtained was subjected to the evaluation on molding appearance and the evaluation on painting appearance after the wet heat test in the same manner as in Example 1.

The results are presented in Table 4.

Example 10

A resin film was fabricated and a fiber-reinforced plastic molded body (molded plate) was obtained in the same manner as in Example 1 except that the resin content in the sheet with release paper was set to 75 g/m².

The molded plate obtained was subjected to the evaluation on molding appearance and the evaluation on painting appearance after the wet heat test in the same manner as in Example 1.

The results are presented in Table 4.

TABLE 4

| | | | Example 1 | Example 8 | Example 9 | Example 10 |
|---|---|---|---|---|---|---|
| Resin film | Fiber areal weight of glass fiber nonwoven fabric | g/m² | 10 | 15 | 10 | 15 |
| | Resin content in sheet with release paper | g/m² | 50 | 50 | 150 | 75 |
| | Molding appearance | | A | B | A | B |
| | Painting appearance | | A | A | A | A |

As presented in Table 4, even in the case of fabricating fiber-reinforced plastic molded bodies using glass fiber nonwoven fabrics having different fiber areal weights and sheets with release paper having different resin contents, the molding appearance and painting appearance after the wet heat test of the fiber-reinforced plastic molded bodies obtained were both excellent.

INDUSTRIAL APPLICABILITY

According to the present invention, a thermosetting resin composition of which curing can be started at a relatively low temperature in a short time and a cured product exhibits high heat resistance and a prepreg to be obtained by impregnating a reinforcing fiber substrate with this thermosetting resin composition are provided.

According to the present invention, a fiber-reinforced plastic molded body which can suppress excessive flow of the resin at the time of heat and pressure treatment, in which the generation of molding appearance defects such as resin withering and fiber meandering on the surface and a defect that fibers are seen through the surface are suppressed, and which exhibits excellent molding appearance and painting appearance, for example, even in the case of being subjected to high cycle press molding or being exposed to a wet heat condition by using a resin film to be obtained using the thermosetting resin composition of the present invention, and a method for producing the same are also provided.

EXPLANATIONS OF LETTERS OR NUMERALS

1 FILM LAMINATE (F)
2 FIBER-REINFORCED PLASTIC MOLDED BODY
3 FLAT PLATE PORTION
4 SIDE PORTION
10 PREPREG SUBSTRATE
12 PREPREG LAMINATE (E)
14 RESIN FILM
20 COMPOSITE MATERIAL PORTION
22 RESIN LAYER
100 MOLD
110 LOWER MOLD
112 CONVEX PORTION
120 UPPER MOLD
122 CONCAVE PORTION

The invention claimed is:
1. A film, comprising:
a reinforcing fiber substrate; and
a thermosetting resin composition, comprising:
an epoxy resin;
an epoxy resin curing agent; and
an epoxy resin curing accelerator comprising a urea derivative,
wherein the epoxy resin curing agent comprises a first curing agent which is an imidazole-based curing agent, not being encapsulated in a microcapsule, and a second curing agent, which is encapsulated in a microcapsule,
wherein the reinforcing fiber substrate has a fiber aerial weight of 50 g/m² or less, and
wherein the thermosetting resin composition is present in a higher areal weight content than the reinforcing fiber substrate in the film.

2. The film of claim 1, wherein the imidazole-based curing agent of the first curing agent is a compound of formula (1)

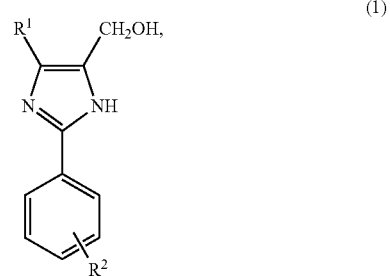

wherein $R^1$ is an optionally substituted linear or branched alkyl group comprising from 1 to 5 carbon atoms, an optionally substituted phenyl group, H, or a hydroxymethyl group, and $R^2$ is a linear or branched alkyl group having from 1 to 5 carbon atoms, an optionally substituted phenyl group, or H, and wherein the second curing agent is a compound of formula (2):

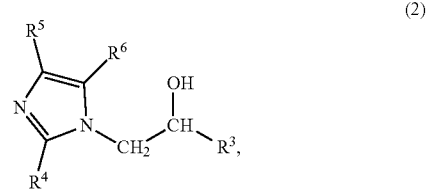

wherein $R^3$ is an organic group comprising a carbon atom and $R^4$ to $R^6$ are independently H, a methyl group, or an ethyl group.

3. The film of claim 1, wherein the imidazole-based curing agent of the first curing agent is a compound of formula (1):

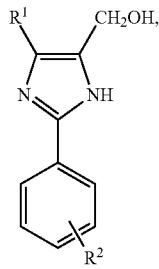
(1)

wherein
- $R^1$ is an optionally substituted linear or branched alkyl group comprising from 1 to 5 carbon atoms, an optionally substituted phenyl group, H, or a hydroxymethyl group, and
- $R^2$ is a linear or branched alkyl group having from 1 to 5 carbon atoms, an optionally substituted phenyl group, or H.

4. The film of claim 1, wherein the urea derivative comprises 3-phenyl-1,1-dimethylurea or 2,4-bis(3,3-dimethylureido)toluene.

5. The film of claim 1, wherein the first curing agent comprises 2-phenyl-4,5-dihydroxymethylimidazole or 2-phenyl-4-methyl-5-hydroxymethylimidazole.

6. The film of claim 1, wherein the second curing agent has a formula (2):

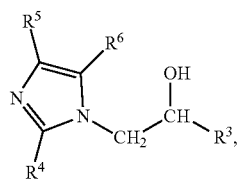
(2)

wherein
- $R^3$ is an organic group comprising a carbon atom, and
- $R^4$ to $R^6$ are independently H, a methyl group, or an ethyl group.

7. The film of claim 1, wherein the epoxy resin comprises an epoxy resin having a structure unit of formula (3):

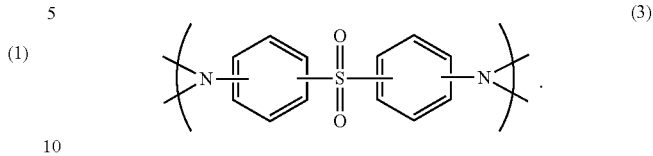
(3)

8. The film of claim 1, wherein the epoxy resin comprises a bisphenol A type epoxy resin.

9. The film of claim 1, wherein, in mass percent,
- the first curing agent is present in a range of from 5 to 15%,
- the second curing agent is present in a range of from 1 to 3%, and
- the urea derivative is present in a range of from 2 to 5%,
in the thermosetting resin composition.

10. The film of claim 1, wherein the thermosetting resin composition has a lowest viscosity at from 80° C. to 98° C. in temperature-programmed viscosity measurement to be conducted under conditions of an initial temperature of 30° C. and a rate of temperature increase of 2.0° C./min, and
wherein the thermosetting resin composition has a glass transition temperature of a cured product obtained by heating the thermosetting resin composition at 140° C. for 5 minutes attained by dynamic viscoelasticity measurement of 150° C. or higher.

11. The film of claim 1, wherein the reinforcing fiber substrate comprises glass fiber.

12. The film of claim 1, wherein the reinforcing fiber substrate comprises carbon fiber.

13. The film of claim 1, wherein the reinforcing fiber substrate is a nonwoven fabric.

14. The film of claim 1, wherein the content of the thermosetting resin composition is in a range of from 30 to 150 g/m².

15. A method for producing a fiber-reinforced plastic molded body, the method comprising:
- preparing a laminate comprising the resin film of claim 1 and a plurality of sheet-like prepreg substrates such that the resin film is arranged on one surface of the laminate; and
- subjecting the laminate to a heat and pressure treatment using a mold.

16. The method of claim 15, further comprising:
shaping the laminate into a preform before subjecting the laminate to the heat and pressure treatment.

17. The film of claim 1, wherein a fiber length of a reinforcing fiber in the film is in a range of from 5 to 50 mm.

18. The film of claim 1, having a thickness in a range of from 20 to 400 μm.

* * * * *